US012496654B2

(12) United States Patent
Huang et al.

(10) Patent No.: US 12,496,654 B2
(45) Date of Patent: Dec. 16, 2025

(54) ULTRASONIC WELDING HEAD AND WELDING DEVICE

(71) Applicant: CONTEMPORARY AMPEREX TECHNOLOGY CO., LIMITED, Fujian (CN)

(72) Inventors: Zhongbao Huang, Fujian (CN); Long Zhang, Fujian (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/785,426

(22) Filed: Jul. 26, 2024

(65) Prior Publication Data
US 2024/0383065 A1 Nov. 21, 2024

Related U.S. Application Data

(63) Continuation of application No. PCT/CN2022/127404, filed on Oct. 25, 2022.

(51) Int. Cl.
*B23K 20/00* (2006.01)
*B23K 20/10* (2006.01)

(52) U.S. Cl.
CPC .................................... *B23K 20/10* (2013.01)

(58) Field of Classification Search
CPC ............ B23K 20/10–106; B29C 66/21; B29C 66/1122; B29C 66/43; B29C 66/7392; B29C 66/8167; B29C 65/08; B29C 66/81419; B29C 66/81433; B29L 2031/3468
(Continued)

(56) References Cited

U.S. PATENT DOCUMENTS 3,934,783 A * 1/1976 Larrison .................. H01L 24/48
228/110.1
4,208,001 A * 6/1980 Martner .............. B29C 66/1122
228/1.1
(Continued)

FOREIGN PATENT DOCUMENTS

CN 207593041 U 7/2018
CN 109202259 A 1/2019
(Continued)

OTHER PUBLICATIONS

International Search Report and Written Opinion mailed on Jul. 15, 2023, received for PCT Application PCT/CN2022/127404, filed on Oct. 25, 2022, 15 pages including English Translation.
(Continued)

*Primary Examiner* — Kiley S Stoner
(74) *Attorney, Agent, or Firm* — XSENSUS LLP

(57) ABSTRACT

Provided are an ultrasonic welding head and a welding device. The ultrasonic welding head comprises a welding surface and a side surface. The welding surface is provided with a first welding tooth. The first welding tooth is configured to weld members to be welded. The side surface has an extension direction which intersects an extension direction of the welding surface. The ultrasonic welding head further comprises a connection surface. The connection surface is connected to the welding surface and the side surface, so as to form an avoidance space to avoid the members to be welded.

18 Claims, 17 Drawing Sheets

(58) Field of Classification Search
USPC .............. 228/1.1, 110.1; 156/73.1–73.6, 156/580.1–580.2
See application file for complete search history.

(56) References Cited

U.S. PATENT DOCUMENTS

| | | | | |
|---|---|---|---|---|
| 5,503,321 | A * | 4/1996 | Urushima | H01L 24/86 228/1.1 |
| 5,820,011 | A * | 10/1998 | Ito | B26D 7/086 156/580.2 |
| 6,089,438 | A * | 7/2000 | Suzuki | B23K 20/106 156/580.2 |
| 7,337,938 | B2 * | 3/2008 | Noro | B29C 66/1122 228/1.1 |
| 2004/0020580 | A1 * | 2/2004 | Oishi | H01R 43/0207 310/26 |
| 2014/0190638 | A1 * | 7/2014 | Hull | B29C 66/244 156/580.2 |
| 2015/0090405 | A1 * | 4/2015 | Hull | B29C 66/81427 156/580.2 |
| 2019/0009357 | A1 * | 1/2019 | Miyashiro | B23K 20/106 |
| 2019/0375166 | A1 * | 12/2019 | De Cuyper | B29C 65/08 |
| 2022/0250331 | A1 | 8/2022 | Weiler et al. | |
| 2023/0045159 | A1 * | 2/2023 | Sakurai | B23K 20/10 |
| 2024/0383065 | A1 * | 11/2024 | Huang | B23K 20/10 |

FOREIGN PATENT DOCUMENTS

| | | | | |
|---|---|---|---|---|
| CN | 109317813 | A * | 2/2019 | ............. B23K 20/26 |
| CN | 210648996 | U | 6/2020 | |
| CN | 211759162 | U | 10/2020 | |
| CN | 111975189 | A * | 11/2020 | ............. B29C 65/08 |
| CN | 215919405 | U | 3/2022 | |
| CN | 216506803 | U | 5/2022 | |
| CN | 216607614 | U | 5/2022 | |
| CN | 115635180 | A * | 1/2023 | ........... B23K 20/106 |
| CN | 116313890 | A * | 6/2023 | ............. H01L 21/607 |
| CN | 220880910 | U * | 5/2024 | ............. B23K 20/10 |
| DE | 10330270 | A1 * | 2/2004 | ......... H01R 43/0207 |
| DE | 102011084503 | A1 | 4/2013 | |
| EP | 0133883 | A1 * | 3/1985 | ............. H01R 4/68 |
| JP | H09108853 | A * | 4/1997 | ........... B23K 26/364 |
| JP | 2008-110382 | A | 5/2008 | |
| JP | 2014213366 | A * | 11/2014 | ............. B23K 20/10 |
| JP | 2016-107291 | A | 6/2016 | |
| JP | 2019005776 | A * | 1/2019 | ............. B23K 20/26 |
| KR | 20110056074 | A * | 5/2011 | ........... B23K 20/106 |
| WO | WO-2013105361 | A1 * | 7/2013 | ........... H01M 50/536 |

OTHER PUBLICATIONS

Extended European Search Report issued Aug. 21, 2025 in European Patent Application No. 22963007.4.

* cited by examiner

ULTRASONIC WELDING HEAD AND WELDING DEVICE

CROSS-REFERENCE TO RELATED APPLICATIONS

This application is a continuation of International Application PCT/CN2022/127404, filed on Oct. 25, 2022, which is incorporated herein by reference in its entirety.

TECHNICAL FIELD

The present application relates to the technical field of welding, and in particular, to an ultrasonic welding head and a welding device.

BACKGROUND ART

Ultrasonic welding is to transmit high-frequency vibration waves to surfaces of two objects to be welded such that the surfaces of the two objects rub against each other under pressure to form fusion between molecular layers. The ultrasonic welding is an efficient connection method for connecting several members to be welded to each other.

As an example, in which the members to be welded are tabs and an adapter of the battery, the tabs and the adapter of the battery are generally connected to each other in the form of a lap-joint structure, and the tabs are in a stacked structure. During welding, the ultrasonic welding head is pressed against the stacked tabs, a certain amount of pressure is applied by means of the ultrasonic welding head, and an ultrasonic apparatus is used to output ultrasonic waves to achieve atomic resonance of adjacent tabs under high-frequency vibration, such that a plurality of layers of tabs are connected together and the tabs and the adapter are connected together.

Since the tabs of the battery are very thin, during the ultrasonic welding, the tabs often rub against and vibrate with the ultrasonic welding head, resulting in undesirable phenomena such as the first layer or multiple layers of tabs being shattered or cracked, thereby reducing the welding quality.

SUMMARY OF THE DISCLOSURE

In view of the above problems, the present application provides an ultrasonic welding head and a welding device, which can improve undesirable phenomena such as breakage or cracking of members to be welded during ultrasonic welding.

In a first aspect, the present application provides an ultrasonic welding head, comprising:
  a welding surface provided with a first welding tooth, the first welding tooth being configured to weld members to be welded; and
  a side surface having an extension direction which intersects an extension direction of the welding surface;
    wherein the ultrasonic welding head further comprises a connection surface which is connected to the welding surface and the side surface, so as to avoid the members to be welded.

In the technical solution of the embodiment of the present application, by providing the connection surface between the welding surface and the side surface, the contact area between the side surface of the ultrasonic welding head and the members to be welded is reduced, so that during ultrasonic welding, frictional forces in non-welding regions of the members to be welded are reduced, and the thinning effect due to friction during the high-frequency vibration of the ultrasonic welding head becomes smaller, thereby improving undesirable phenomena such as breakage or cracking of the members to be welded, and thus effectively improving the welding quality.

In some embodiments, the connection surface is in smooth transition connection with the welding surface.

In this way, during the ultrasonic welding, no tab will be cut when a transition region between the connection surface and the welding surface comes into contact with tabs, thereby reducing the magnitude of a frictional force between this region and the tabs, making the tabs in this region less likely to be subjected to undesirable phenomena such as breakage or cracking due to friction.

In some embodiments, the connection surface comprises a circular arc surface and an avoidance surface, the circular arc surface is connected to the avoidance surface and the welding surface, and the circular arc surface is tangent to the welding surface.

In this way, the circular arc surface and the avoidance surface are subjected to small frictional forces when in contact with the tabs, so that the tabs are less likely to be subjected to undesirable phenomena such as breakage or cracking due to friction during the ultrasonic welding. In addition, the ultrasonic welding head is also easy to manufacture and form.

In some embodiments, the circular arc surface has a radius ranging from 0.5 mm to 1.5 mm.

In this way, when the radius R of the circular arc surface is in the range of 0.5 mm to 1.5 mm, the contact area between the tabs and the circular arc surface is small during the ultrasonic welding, so that the tabs are less likely to be subjected to undesirable phenomena such as breakage or cracking due to friction during the ultrasonic welding.

In some embodiments, a second welding tooth is provided on the circular arc surface.

In this way, the second welding tooth can pre-press and shape the tabs in advance before the high-frequency vibration of the ultrasonic welding head. Since the tabs are in a stacked structure and are in a fluffy state in the surface region, the second welding tooth can compress the tabs in the fluffy state. Moreover, with the provision of the second welding tooth, it is also possible to change the friction between the tabs and the circular arc surface from the original large-plane friction to a small-plane friction, so that the overall friction area between the tabs and the ultrasonic welding head can be reduced, and the tabs are less likely to be subjected to undesirable phenomena such as breakage or cracking due to friction during the ultrasonic welding.

In some embodiments, a projection of the avoidance surface on a first plane has a height ranging from 0.5 mm to 2 mm, the first plane being perpendicular to the welding surface; and/or
  a projection of the avoidance surface on a second plane has a width ranging from 0.5 mm to 1.5 mm, the second plane being parallel to the welding surface.

In this way, when the projection of the avoidance surface on the first plane has a height ranging from 0.5 mm to 2 mm, the contact area between the avoidance surface and the tabs is small in a direction in which the avoidance surface and the tabs are parallel to each other, so that the tabs are less likely to be subjected to undesirable phenomena such as breakage or cracking due to friction during the ultrasonic welding.

When the projection of the avoidance surface on the second plane has a width ranging from 0.5 mm to 1.5 mm, the contact area between the avoidance surface and the tabs is small in a direction in which the avoidance surface and the tabs form an angle with each other, so that the tabs are less likely to be subjected to undesirable phenomena such as breakage or cracking due to friction during the ultrasonic welding.

In some embodiments, the surface form of the connection surface comprises at least one of an inclined surface and an arc-shaped surface, the inclined surface being inclined relative to the welding surface.

In this way, by arranging the inclined surface and the welding surface in an inclined state, it is possible that during the high-frequency vibration of the ultrasonic welding head, the contact area between the side surface of the ultrasonic welding head and the tabs becomes smaller, so that the tabs are less likely to be subjected to undesirable phenomena such as breakage or cracking due to friction during the ultrasonic welding.

In some embodiments, when the surface form of the connection surface comprises an inclined surface, an included angle between the inclined surface and the welding surface is greater than an included angle between the welding surface and the side surface.

In this way, compared to when the included angle between the inclined surface and the welding surface is less than or equal to the included angle between the welding surface and the side surface, the included angle between the inclined surface and the welding surface is set to be greater than the included angle between the welding surface and the side surface to make the contact area between an avoidance space and the ultrasonic welding head is smaller, so that the tabs are less likely to be subjected to undesirable phenomena such as breakage or cracking due to friction during the ultrasonic welding.

In some embodiments, the included angle between the inclined surface and the welding surface is an obtuse angle, and the side surface is perpendicular to the welding surface.

In this way, when the included angle between the inclined surface and the welding surface is an obtuse angle, if the side surface is not perpendicular to the welding surface, it will cause the side surface to cut the tabs, so that the tabs are subjected to undesirable phenomena such as breakage or cracking due to friction with the side surface.

In some embodiments, a second welding tooth is arranged at a connection between the connection surface and the welding surface.

In this way, the second welding tooth can pre-press and shape the tabs in advance before the high-frequency vibration of the ultrasonic welding head. Since the tabs are in a stacked structure and are in a fluffy state in the surface region, the second welding tooth can compress the tabs in the fluffy state. Moreover, with the provision of the second welding tooth, it is also possible to change the friction between the tabs and a connection region between the connection surface and the welding surface from the original large-plane friction to a small-plane friction, so that the overall friction area between the tabs and the ultrasonic welding head can be reduced, and the tabs are less likely to be subjected to undesirable phenomena such as breakage or cracking due to friction during the ultrasonic welding.

In some embodiments, the second welding tooth is arranged at a connection line between the connection surface and the welding surface.

In this way, by arranging the second welding tooth at the connection line between the connection surface and the welding surface, the second welding tooth can fully pre-press and shape the tabs before the ultrasonic welding. When the ultrasonic welding head approaches a pressure-side tab, compared with other positions, the second welding tooth at the connection line may first come into contact with the pressure-side tab, so that the tab can be pre-pressed and shaped faster.

In some embodiments, the first welding tooth has a height greater than that of the second welding tooth.

In this way, the height of the first welding tooth being greater than that of the second welding tooth can prevent the second welding tooth from affecting the contact between the first welding tooth and the tabs, thereby avoiding false welding.

In some embodiments, there are a plurality of first welding teeth and a plurality of second welding teeth, the plurality of first welding teeth are arranged at intervals in a matrix, and at least one of the second welding teeth is located at an extension of a gap between two adjacent first welding teeth.

In this way, the plurality of second welding teeth can pre-press and shape the contact region between the ultrasonic welding head and the tabs in advance to ensure the flatness of the surfaces of the tabs, the plurality of first welding teeth can improve the welding efficiency of the ultrasonic welding head to the tabs, and the positioning of a second welding tooth between two adjacent first welding teeth can optimize the space occupation of the ultrasonic welding head, thereby reducing the overall size of the ultrasonic welding head and reducing the production and manufacturing costs of the ultrasonic welding head.

In some embodiments, the second welding tooth has a spherical shape. When the second welding tooth is spherical, the second welding tooth can change the friction between the tabs and the connection surface from the original large-plane friction to spherical friction. Compared with a non-spherical second welding tooth, this can reduce the overall friction area between the tabs and the ultrasonic welding head, and can also weaken the cutting effect between the ultrasonic welding head and the tabs, so that the tabs are less likely to be subjected to undesirable phenomena such as breakage or cracking due to friction during the ultrasonic welding.

In some embodiments, the first welding tooth comprises a first tooth and a second tooth arranged spaced apart from the first tooth, the second tooth is arranged closer to the connection surface than the first tooth, and a contact area between the second tooth and the members to be welded is greater than a contact area between the first tooth and the members to be welded.

In this way, the second tooth is arranged closer to the connection surface and the contact area between the second tooth and the members to be welded is greater than the contact area between the first tooth and the members to be welded, so that the tab in contact with the second tooth can be stretched, in other words the length of the tab participating in the ultrasonic vibration increases. It can be understood that since the area increases and the pressing forces from the first tooth and the second tooth are constant, the pressure on the tab in contact with the second tooth becomes smaller, thereby reducing the friction tearing force from the ultrasonic welding head on the tab during the welding, and thus alleviating the undesirable phenomena such as breakage or cracking of the tab due to friction during the ultrasonic welding.

In some embodiments, the first tooth comprises a first connection surface connected to the welding surface, the second tooth comprises a second connection surface connected to the welding surface, the first welding tooth comprises a first tooth and a second tooth arranged spaced apart from the first tooth, the second tooth is arranged closer to the connection surface than the first tooth, and the second connection surface has an area greater than that of the first connection surface area.

In this way, the welding area of the second tooth is large, the contact between the second tooth and the pressure-side tab is more stable, and the stress in the contact region between the tab and the second tooth is reduced.

In some embodiments, the second tooth comprises a space-keeping surface which is oriented in the same direction as the connection surface.

In this way, compared with the first tooth without a space-keeping surface, during the welding, the contact area between the second tooth and the members to be welded is larger, so that the tab in contact with the second tooth can be stretched, in other words the length of the tab participating in the ultrasonic vibration increases. It can be understood that since the area increases and the pressing forces from the first tooth and the second tooth are constant, the pressure on the tab in contact with the second tooth becomes smaller. In addition, the space-keeping surface can reduce the contact area between the second tooth and the non-welding region of the tab, thereby reducing the friction tearing force from the ultrasonic welding head on the tab during the welding, and thus alleviating the undesirable phenomena such as breakage or cracking of the tab due to friction during the ultrasonic welding.

In some embodiments, an extension direction of an intersection line between the welding surface and the connection surface is a first direction, a second direction is perpendicular to the first direction, and the centers of the first tooth and the second tooth are aligned with each other in the second direction.

In this way, during the ultrasonic welding, the welded parts of the tabs are vibrated uniformly and are less likely to be subjected to undesirable phenomena such as breakage or cracking.

In some embodiments, in the second direction, the first tooth has a dimension less than that of the second tooth; and in the first direction, the first tooth has a dimension equal to that of the second tooth.

In this way, the dimension of the second tooth in the second direction is greater than that of the first tooth, making it easier to perform further machining on the second tooth, so as to create a space-keeping structure on the second tooth. The dimension of the second tooth in the first direction is equal to that of the first tooth, so that the space of the welding surface is effectively utilized.

In a second aspect, the present application provides a welding device, comprising an ultrasonic welding head in the foregoing embodiments.

The above description is only an overview of the technical solutions of the present application. In order to more clearly understand the technical means of the present application to implement same according to the contents of the description, and in order to make the above and other objectives, features and advantages of the present application more obvious and understandable, specific implementations of the present application are exemplarily described below.

BRIEF DESCRIPTION OF THE DRAWINGS

Various other advantages and benefits will become obvious to those of ordinary skill in the art upon reading the following detailed description of optional implementations. The accompanying drawings are merely for the purpose of illustrating the optional implementations, and are not to be construed as limiting the present application. Moreover, like components are denoted by like reference numerals throughout the accompanying drawings. In the drawings.

Figure 1:
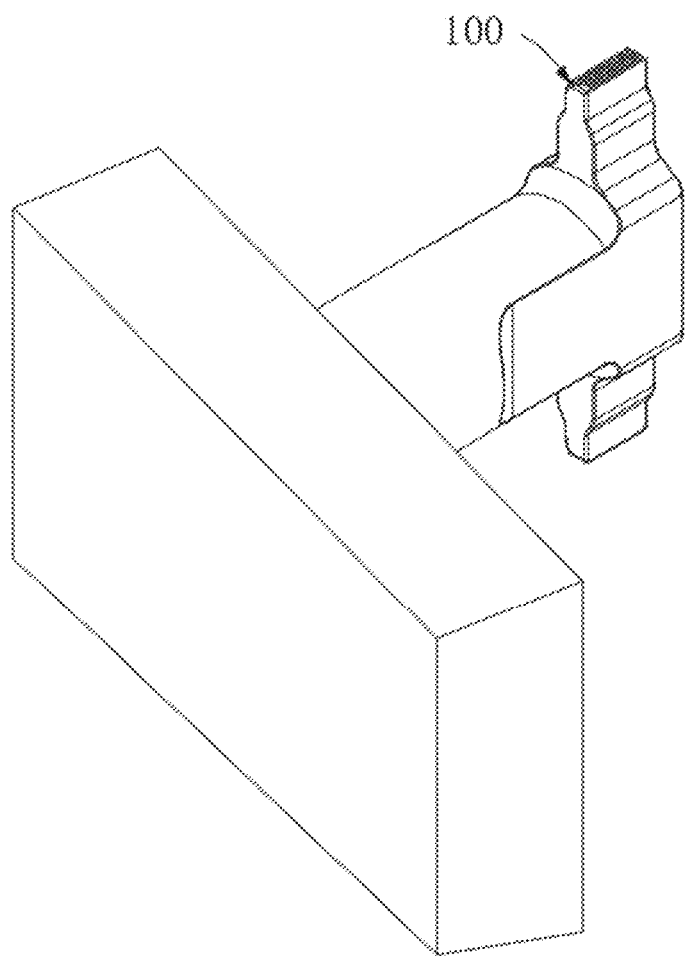
FIG. 1 is a schematic structural diagram of a welding device according to some embodiments of the present application.

REFERENCE SIGNS IN DETAILED DESCRIPTION OF EMBODIMENTS welding device 1000; ultrasonic welding head 100; main body portion 200; member to be welded 201; tab 210; pressure-side tab 211; cell-side tab 213; corner tab 215; adapter 300; welding surface 10; side surface 20; connection surface 30; first extension plane 11; second extension plane 21; avoidance space 400; circular arc surface 31; avoidance surface 33; inclined surface 35; arc-shaped surface 37; first plane 500; second plane 600; second welding tooth 40; first welding tooth 50;

first tooth 51; second tooth 53; space-keeping surface 530; first connection surface 510; second connection surface 531.

DETAILED DESCRIPTION OF EMBODIMENTS

Embodiments of the technical solutions of the present application will be described in detail below with reference to the accompanying drawings. The following embodiments are merely intended to more clearly illustrate the technical solutions of the present application, so they merely serve as examples, but are not intended to limit the scope of protection of the present application.

Unless otherwise defined, all technical and scientific terms used herein have the same meanings as those commonly understood by those skilled in the art to which the present application belongs. The terms used herein are merely for the purpose of describing specific embodiments, but are not intended to limit the present application. The terms "comprising" and "having" and any variations thereof in the description and the claims of the present application as well as the brief description of the accompanying drawings described above are intended to cover non-exclusive inclusion.

In the description of the embodiments of the present application, the technical terms "first", "second", etc. are merely used for distinguishing different objects, and are not to be construed as indicating or implying relative importance or implicitly indicating the number, particular order or primary-secondary relationship of the indicated technical features. In the description of the embodiments of the present application, the phrase "a plurality of" means two or more, unless otherwise explicitly and specifically defined.

The phrase "embodiment" mentioned herein means that the specific features, structures, or characteristics described in conjunction with the embodiment can be encompassed in at least one embodiment of the present application. The phrase at various locations in the description does not necessarily refer to the same embodiment, or an independent or alternative embodiment exclusive of another embodiment. Those skilled in the art understand explicitly or implicitly that the embodiment described herein may be combined with another embodiment.

In the description of the embodiments of the present application, the term "and/or" is merely intended to describe the associated relationship of associated objects, indicating that three relationships can exist, for example, A and/or B can include: only A exists, both A and B exist, and only B exists. In addition, the character "/" herein generally indicates an "or" relationship between the associated objects.

In the description of the embodiments of the present application, the term "a plurality of" means two or more (including two), similarly the term "a plurality of groups" means two or more groups (including two groups), and the term "a plurality of pieces" means two or more pieces (including two pieces).

In the description of the embodiments of the present application, the orientation or position relationship indicated by the technical terms "central", "longitudinal", "transverse", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. are based on the orientation or position relationship shown in the accompanying drawings and are merely intended to facilitate and simplify the description of the embodiments of the present application, rather than indicating or implying that the apparatus or element considered must have a particular orientation or be constructed and operated in a particular orientation, and therefore not to be construed as limiting the embodiments of the present application.

In the description of the embodiments of the present application, unless otherwise explicitly specified and defined, the technical terms such as "mount", "couple", "connect", and "fix" should be understood in a broad sense, for example, they may be a fixed connection, a detachable connection, or an integrated connection; may be a mechanical connection or an electric connection; and may be a direct connection or an indirect connection by means of an intermediate medium, or may be internal communication between two elements or interaction between the two elements. For those of ordinary skill in the art, the specific meanings of the above terms in the embodiments of the present application can be understood according to specific situations.

At present, from the perspective of the development of the market situation, batteries are used more and more widely. The batteries are not only used in energy storage power systems such as hydroelectric power plants, thermal power plants, wind power plants and solar power plants, but also widely used in electric transportation means such as electric bicycles, electric motorcycles and electric vehicles and in many fields such as military equipment and aerospace. With the continuous expansion of the application field of batteries, the market demand for the batteries is also expanding.

The inventors have noticed that during welding of members to be welded of a battery, especially during connection between tabs and an adapter in the battery, ultrasonic welding technology is generally used. Ultrasonic welding is to transmit high-frequency vibration waves to surfaces of two objects to be welded such that the surfaces of the two objects rub against each other under pressure to form fusion between molecular layers, and thus has high efficiency, high quality, attractive appearance, energy saving, high welding strength and other advantages. The ultrasonic welding is an efficient connection method for connecting the tabs and the adapter to each other. In the battery, the tabs are generally in a structure in which a plurality of tabs are stacked together, and the connection between the tabs and the adapter generally adopts a lap-joint structure. During welding, the ultrasonic welding head is pressed against the stacked tabs, a certain amount of pressure is applied by means of the ultrasonic welding head, and an ultrasonic apparatus then outputs ultrasonic waves to achieve atomic resonance of adjacent tabs under high-frequency vibration, such that the tabs and the adapter are connected together.

However, the tabs of the battery are very thin, generally only 5-20 μm for a single layer of tab. During the welding of the tabs and the adapter, the tabs extend from an electrode assembly. It can be understood that the height of the tab near a main body portion of the electrode assembly will be higher than the tab on the side pressed by the ultrasonic welding head, and there will be a certain angle between the two parts. In this solution, for ease of illustration, the tab on the side close to the main body portion of the electrode assembly is called a cell-side tab, the tab pressed by the ultrasonic welding head is called a pressure-side tab, and a tab in the region between the cell-side tab and the pressure-side tab is called a corner tab. The corner tab is located at an edge of the ultrasonic welding head.

The ultrasonic welding head is divided into a welding region and a non-welding region, the welding region is parallel to the pressure-side tab, and the non-welding region has a certain angle to the pressure-side tab. When welding, it is necessary to press the ultrasonic welding head against the stacked tabs, that is, the welding region is in direct contact with the pressure-side tab, and in a region of the ultrasonic welding head that is close to a battery cell, there is a certain angle between the pressure-side tab and the non-welding region of the ultrasonic welding head. Further, the cell-side tab and the corner tab may be in direct contact with the non-welding region. Since during the ultrasonic welding, the ultrasonic welding head is constantly vibrated and displaced at high frequencies, the corner tab and the cell-side tab constantly rub against the non-welding region of the ultrasonic welding head during the ultrasonic welding, resulting in phenomena such as the first layer or multiple layers of tabs being shattered or cracked, so that metal debris may be generated in the battery region, affecting the quality of the battery.

In order to solve the problem of the tab being shattered or cracked during the ultrasonic welding, the inventors have found that the ultrasonic welding head in the welding device can be improved in design. Specifically, in order to improve the structure of the ultrasonic welding head, an avoidance space is designed in the ultrasonic welding head.

Further, the avoidance space is designed between the welding region and the non-welding region of the ultrasonic welding head to reduce the contact area between the corner tab and the cell-side tab and the non-welding region of the ultrasonic welding head.

In such a welding device, due to the avoidance space designed in the ultrasonic welding head, during the ultrasonic welding, the contact area between the non-welding region of the ultrasonic welding head and the corner tab and the cell-side tab is reduced, so that the degree of friction between the ultrasonic welding head and the corner tab and cell-side tab is reduced, and the corner tab and cell-side tab are thus less likely to be subjected to undesirable phenomena such as breakage or cracking due to friction during the ultrasonic welding.

The ultrasonic welding head disclosed in the embodiments of the present application may be used in a welding device using the ultrasonic welding technology. The welding device may be, but is not limited to, an ultrasonic plastic welding machine, an ultrasonic metal welding machine, etc.

For ease of description of the embodiments below, an example in which a welding device 1000 according to an embodiment of the present application is an ultrasonic metal welding machine is used for description.

Referring to FIG. 1, FIG. 1 is a schematic structural diagram of a welding device 1000 according to some embodiments of the present application. The ultrasonic metal welding machine may comprise an ultrasonic welding head 100 and other functional components. The specific model of the ultrasonic metal welding machine is not limited in the embodiments of the present application, as long as it can meet the requirements for mounting the ultrasonic welding head 100 according to the embodiments of the present application.

Figure 2:
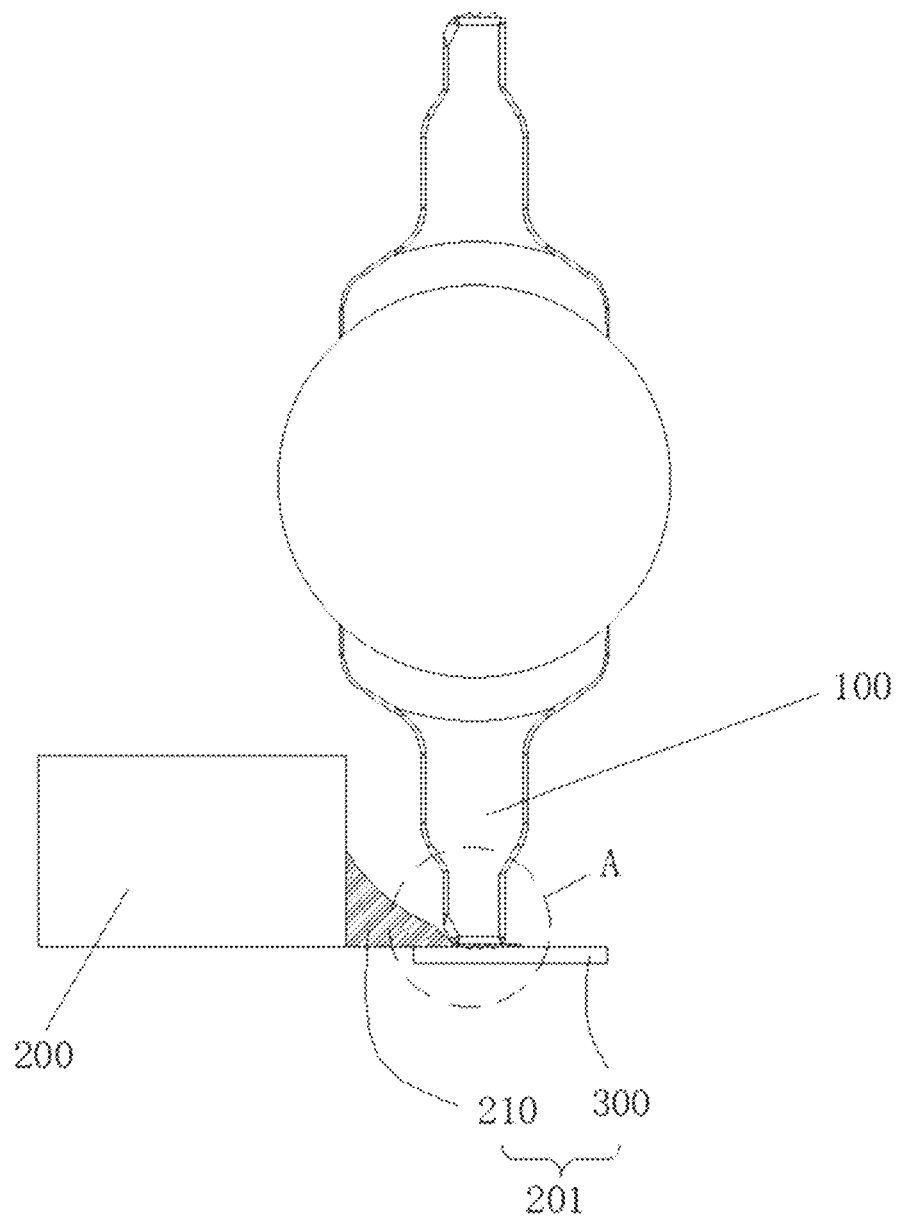
FIG. 2 is a schematic diagram of ultrasonic welding according to some embodiments of the present application.

Referring further to FIG. 2, FIG. 2 is a schematic diagram of ultrasonic welding according to some embodiments of the present application. First of all, it should be noted that when describing the embodiments of the present application, members to be welded 201 are designated as tabs 210 and an adapter 300, but this is only an example for convenience of understanding and cannot be understood as a limitation of the present application. It can be understood that the members to be welded 201 may be any objects that are processed and manufactured using the ultrasonic welding head 100 according to some embodiments of the present application.

Figure 3:
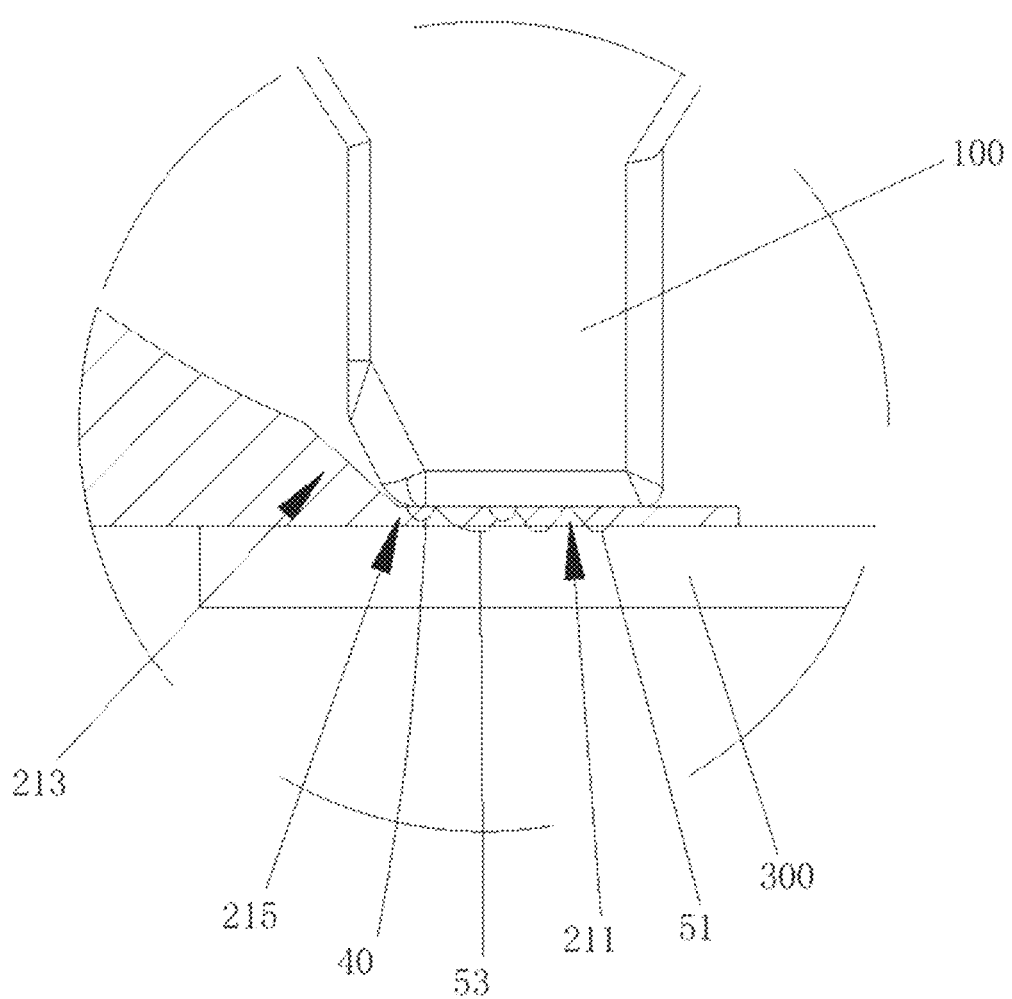
FIG. 3 is an enlarged view of part A of the schematic diagram of ultrasonic welding in FIG. 2.

An electrode assembly is an assembly of the battery, and the type of the electrode assembly is not limited in the embodiments of the present application. The electrode assembly comprises a main body portion 200 and tabs 210. The tabs 210 are connected to the main body portion 200. The tabs 210 may be aluminum tabs, nickel tabs, copper-plated nickel tabs, etc. The material type of the tabs 210 is not limited in the embodiments of the present application. During ultrasonic welding, the tabs 210 are generally in a stacked state, that is, a plurality of tabs 210 are stacked together. Referring further to FIG. 3, FIG. 3 is an enlarged view of part A of the schematic diagram of ultrasonic welding in FIG. 2. In this solution, the tabs 210 may comprise a pressure-side tab 211, a corner tab 215 and a cell-side tab 213.

During the ultrasonic welding, the tabs 210 are placed on the adapter 300, and the ultrasonic welding head 100 is pressed against the tabs 210. Further, the ultrasonic welding head 100 is pressed against the pressure-side tab 211. Through the high-frequency vibration and displacement of the ultrasonic welding head 100, the tabs 210 and the adapter 300 are welded together.

Figure 4:
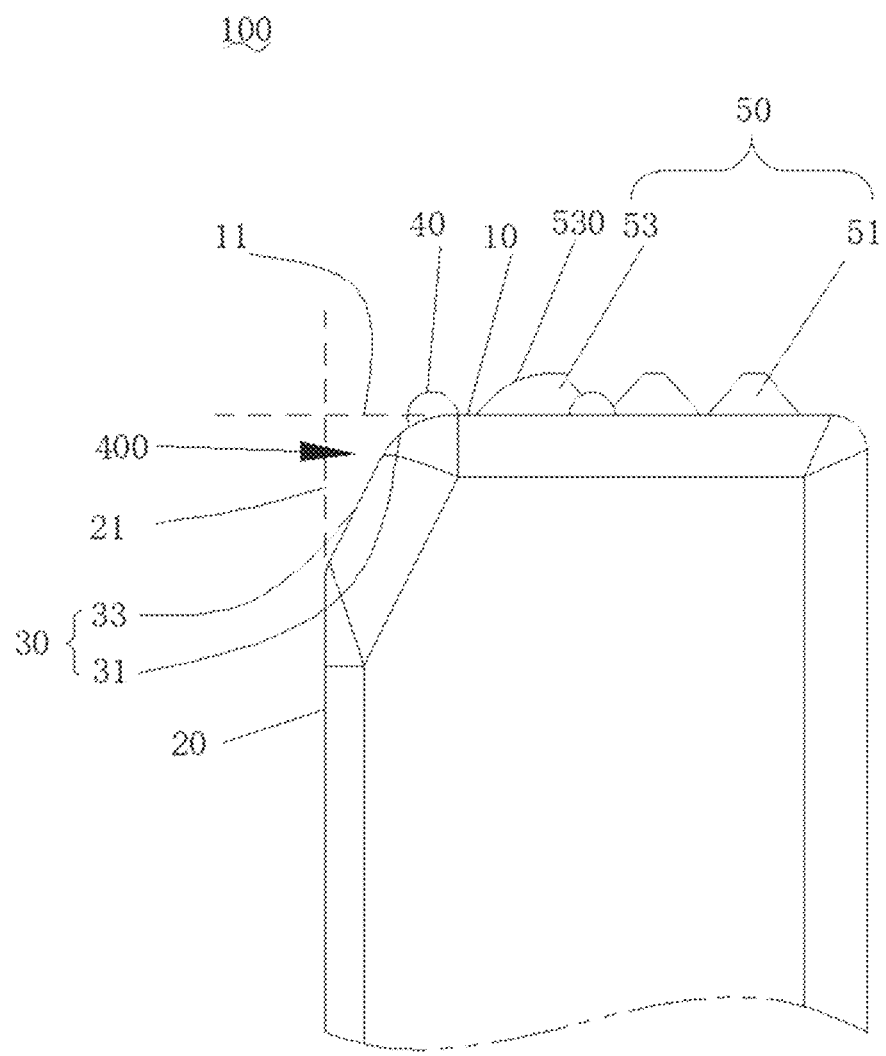
FIG. 4 is a schematic structural diagram of an ultrasonic welding head according to some embodiments of the present application.
Figure 5:
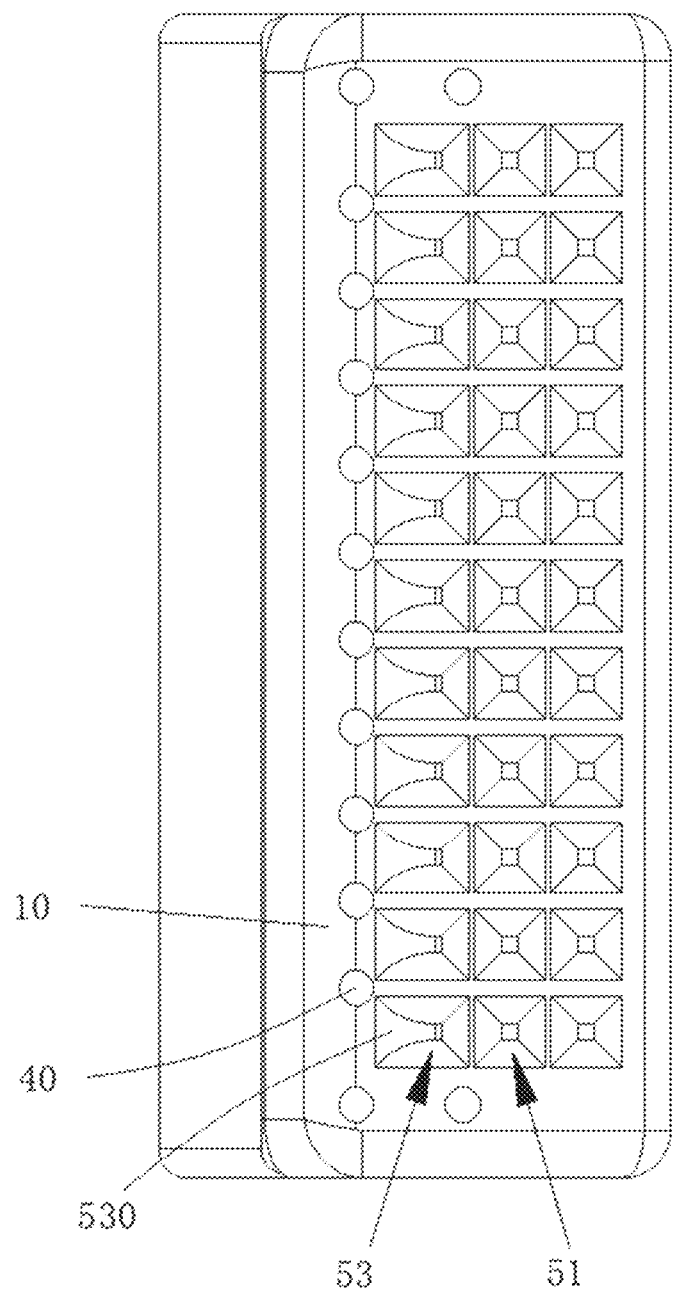
FIG. 5 is a schematic structural diagram of an ultrasonic welding head according to some embodiments of the present application.
Figure 6:
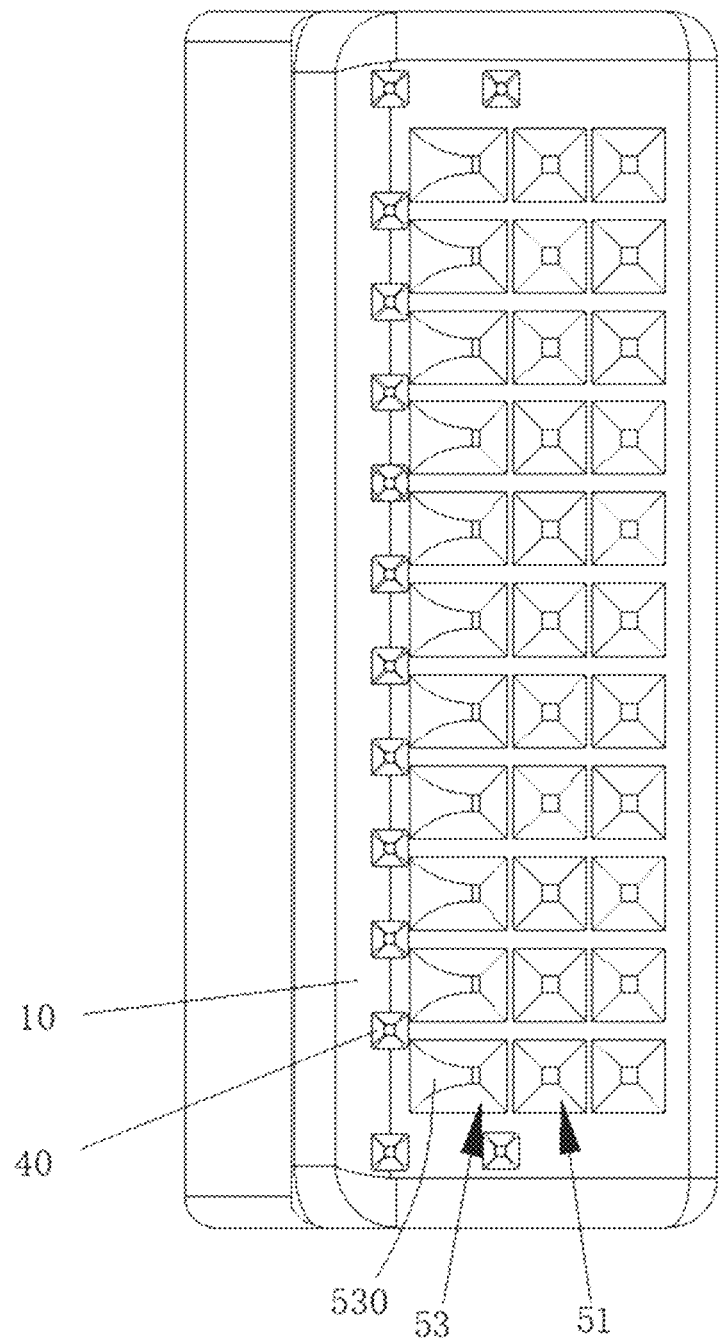
FIG. 6 is a schematic structural diagram of an ultrasonic welding head according to some embodiments of the present application.
Figure 7:
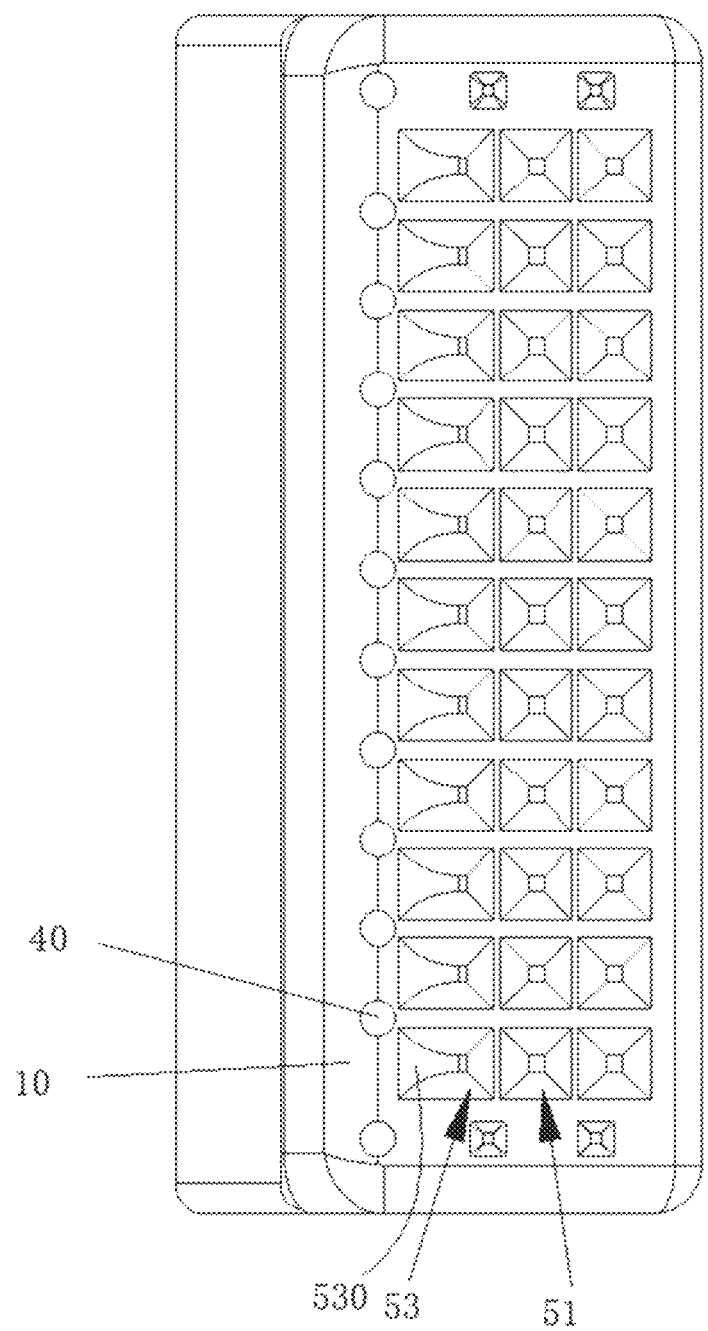
FIG. 7 is a schematic structural diagram of an ultrasonic welding head according to some embodiments of the present application.
Figure 8:
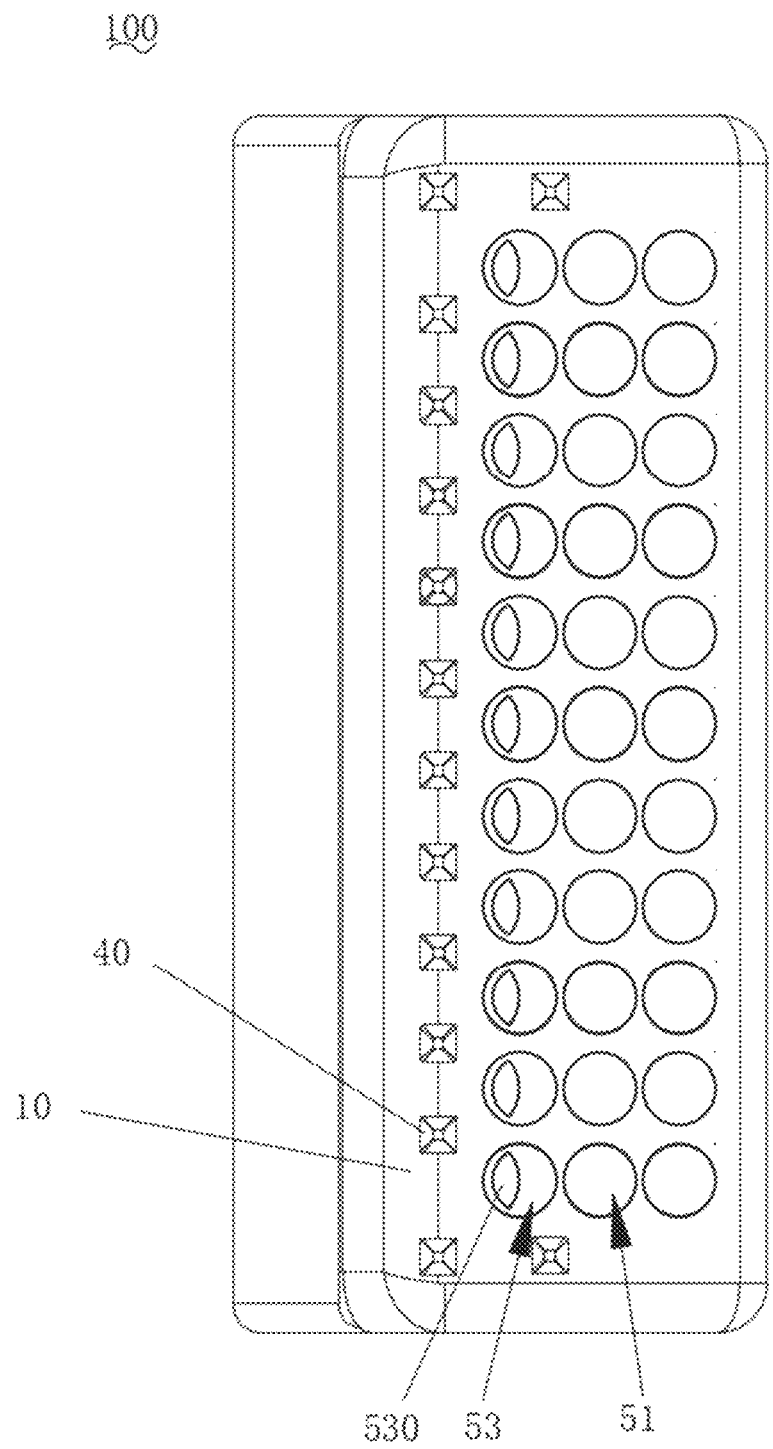
FIG. 8 is a schematic structural diagram of an ultrasonic welding head according to some embodiments of the present application.
Figure 9:
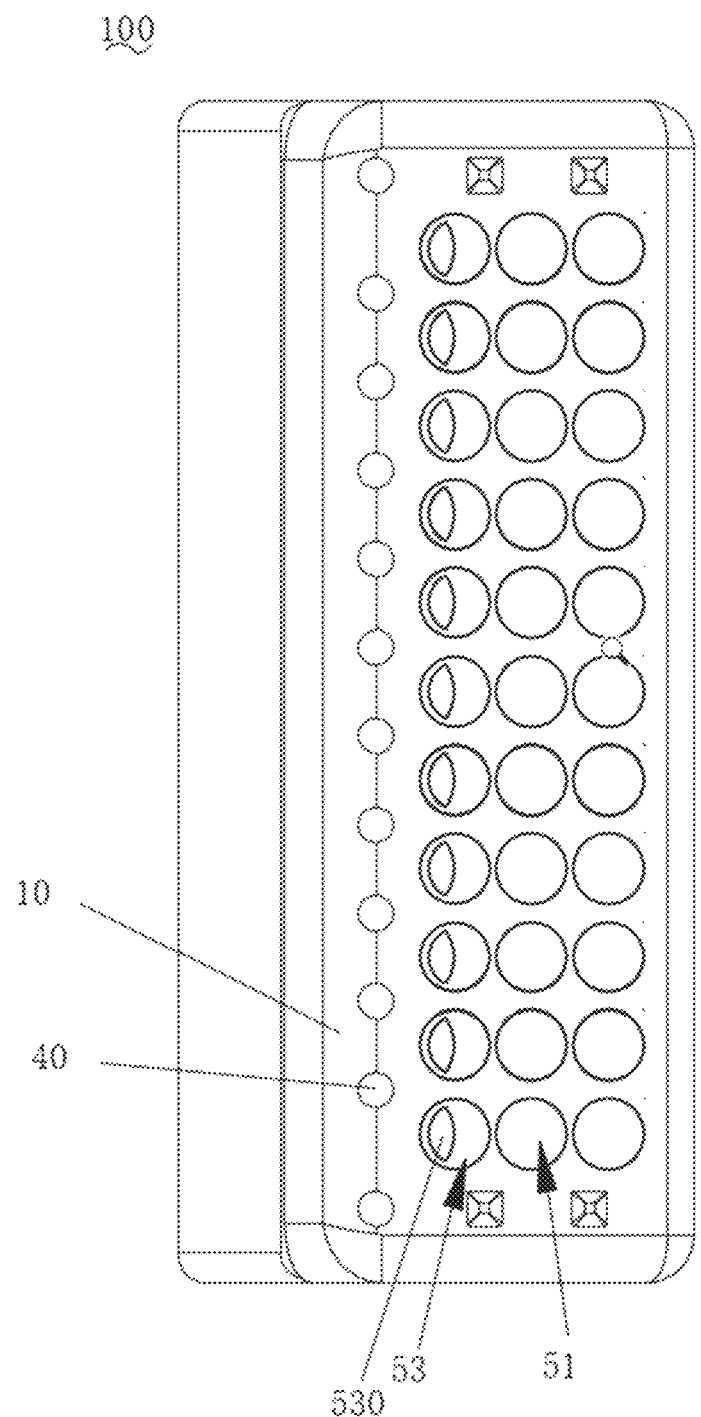
FIG. 9 is a schematic structural diagram of an ultrasonic welding head according to some embodiments of the present application.

According to some embodiments of the present application, optionally, referring further to FIGS. 2 to 9, FIG. 4 is a schematic structural diagram of an ultrasonic welding head 100 according to some embodiments of the present application, FIG. 5 is a schematic structural diagram of an ultrasonic welding head 100 according to some embodiments of the present application, FIG. 6 is a schematic structural diagram of an ultrasonic welding head 100 according to some embodiments of the present application, FIG. 7 is a schematic structural diagram of an ultrasonic welding head 100 according to some embodiments of the present application, FIG. 8 is a schematic structural diagram of an ultrasonic welding head 100 according to some embodiments of the present application, and FIG. 9 is a schematic structural diagram of an ultrasonic welding head 100 according to some embodiments of the present application. The embodiments of the present application provide an ultrasonic welding head 100. The ultrasonic welding head 100 comprises a welding surface 10 and a side surface 20. The welding surface 10 is provided with a first welding tooth 50. The first welding tooth 50 is configured to weld members to be welded 201. The side surface 20 has an extension direction which intersects an extension direction of the welding surface 10. The ultrasonic welding head 100 further comprises a connection surface 30. The connection surface 30 is connected to the welding surface 10 and the side surface 20, so as to avoid the members to be welded 201.

Specifically, the ultrasonic welding head 100 is a welding head using the ultrasonic welding technology. In order to adapt to the alternating load generated by high-frequency vibration during the ultrasonic welding, the ultrasonic welding head 100 should be made of a material with a high fatigue strength, such as an aluminum alloy and a titanium alloy, which will not be limited in the embodiments of the present application. The ultrasonic welding head 100 may be a cylinder, a cuboid, a truncated cone, etc., which will not be limited in the embodiments of the present application.

The welding surface 10 is a welding region of the ultrasonic welding head 100. During the ultrasonic welding, the welding surface 10 is parallel to the pressure-side tab 211. Further, the welding surface 10 is in direct contact with the pressure-side tab 211 and is pressed against the pressure-side tab 211. The welding surface 10 may be a rectangular surface, a square surface, a circular surface, etc., and the specific shape of the welding surface 10 is not limited in the embodiments of the present application. A first extension plane 11 is a plane extending from the welding surface 10 toward the cell-side tab 213 in a length direction of the ultrasonic welding head 100.

The side surface 20 is a non-welding region of the ultrasonic welding head 100. During the ultrasonic welding, the side surface 20 has an angle to the pressure-side tab 211. The side surface 20 may be a rectangular surface, a square surface, a circular surface, etc., and the specific shape of the welding surface 10 is not limited in the embodiments of the present application. A second extension plane 21 is a plane extending from the side surface 20 toward the pressure-side tab 211 in a height direction of the ultrasonic welding head 100.

The first welding tooth 50 may be a working welding tooth of the ultrasonic welding head 100, or the first welding tooth 50 may be a structure on the ultrasonic welding head 100 that is in direct contact with and pressed against the pressure-side tab 211 during the ultrasonic welding.

As shown in FIGS. 5 to 9, the first welding tooth 50 may be a pyramid, a sphere, a mixture of the two, etc. The specific shape of the first welding tooth 50 is not limited in the embodiments of the present application. Optionally, the first welding tooth 50 is a pyramid. The first welding tooth 50 may penetrate through the pressure-side tab 211. Further, the first welding tooth 50 may penetrate through the first layer or multiple surface layers of pressure-side tabs 210.

By "the side surface 20 has an extension direction which intersects an extension direction of the welding surface 10", it is meant that the side surface 20 and the welding surface 10 have a certain spatial angle. For example, the spatial angle between the side surface 20 and the welding surface 10 is 90 degrees. In this case, the side surface 20 and the welding surface 10 are perpendicular to each other.

Taking the ultrasonic welding head 100 defined as a cuboid as an example, the ultrasonic welding head 100 may comprise a top surface and peripheral surfaces connected to the top surface. The top surface corresponds to the welding surface 10. Since the tabs 210 are in a stacked state, the corner tab 215 and the cell-side tab 213 would be partially warped upward. Specifically, the corner tab 215 and the cell-side tab 213 move closer to the peripheral surfaces, and the corner tab 215 and the cell-side tab 213 constantly rub against the peripheral surfaces during the continuous high-frequency vibration and displacement of the ultrasonic welding head 100, thereby causing the breakage or cracking of the tabs 210. Here, the side surface 20 can be understood as any one of the peripheral surfaces, or all the peripheral surfaces.

The connection surface 30 is a surface between the welding surface 10 and the side surface 20. The connection surface 30 can be regarded as a transition surface or a chamfer surface between the welding surface 10 and the side surface 20. The connection surface 30 may be a linear surface or a curved surface.

The welding surface 10, the side surface 20 and the connection surface 30 may jointly define an avoidance space 400. The avoidance space 400 may be a space surrounded by the connection surface 30, the first extension plane 11 and the second extension plane 21, and the avoidance space 400 is not a closed space. Taking the ultrasonic welding head 100 defined as a cuboid as an example, along a straight line, which is defined as being parallel to a diagonal line of the cuboid and close to one of the vertices of the cuboid, from the top surface of the cuboid along a linear or curved path to an edge which is close to this vertex and extends from the top surface to the bottom surface, a part of the cuboid that is close to this vertex is removed, and the virtual space left by the removed part is the avoidance space 400.

In the technical solution of the embodiment of the present application, by providing the connection surface 30 between the welding surface 10 and the side surface 20, the contact area between the side surface 20 of the ultrasonic welding head 100 and the members to be welded 201 is reduced, so that during ultrasonic welding, the contact areas of non-welding regions of the members to be welded 201 are reduced, thereby improving undesirable phenomena such as breakage or cracking of the tabs 210, and thus effectively improving the welding quality.

According to some embodiments of the present application, optionally, referring further to FIGS. 2 and 4, the connection surface 30 is in smooth transition connection with the welding surface 10.

Specifically, "smooth transition connection" refers to a circular arc transitional connection between the connection surface 30 and the welding surface 10, that is, in terms of technology, a rounding process is performed between the connection surface 30 and the welding surface 10.

Of course, there may also be other curved transition forms between the connection surface 30 and the welding surface 10, which will not be specifically limited in the embodiments of the present application, as long as there is no local height difference at the transition between the connection surface 30 and the welding surface 10.

In this way, during the ultrasonic welding, no tab 210 will be cut when a transition region between the connection surface 30 and the welding surface 10 comes into contact with the tabs 210, thereby reducing the magnitude of a frictional force between this region and the tabs 210, making the tabs 210 in this region less likely to be subjected to undesirable phenomena such as breakage or cracking due to friction.

According to some embodiments of the present application, optionally, referring further to FIGS. 2 to 4, the connection surface 30 comprises a circular arc surface 31 and an avoidance surface 33. The circular arc surface 31 is connected to the avoidance surface 33 and the welding surface 10, and the circular arc surface 31 is tangent to the welding surface 10.

Specifically, taking the ultrasonic welding head 100 defined as a cuboid as an example, the top surface corresponds to the welding surface 10. The avoidance surface 33 may be a transition surface between the corresponding peripheral surface close to the cell-side tab 213 and the top surface, and the circular arc surface 31 may be a transition surface between the peripheral surface close to the cell-side tab 213 and the top surface. Here, the side surface 20 can be understood as any one of the peripheral surfaces, or all the peripheral surfaces.

By "tangential connection" means that the angle between an end of the circular arc surface 31 that is away from the avoidance surface 33 and the welding surface 10 is 180 degrees.

In this way, the circular arc surface 31 and the avoidance surface 33 are subjected to small frictional forces when in contact with the tabs 210, so that the tabs 210 are less likely to be subjected to undesirable phenomena such as breakage or cracking due to friction during the ultrasonic welding. In addition, the ultrasonic welding head 100 is also easy to manufacture and form.

According to some embodiments of the present application, optionally, referring further to FIGS. 2, 3, 4 and 10, FIG. 10 is a schematic structural diagram of an ultrasonic welding head 100 according to some embodiments of the present application. The circular arc surface 31 has a radius R ranging from 0.5 mm to 1.5 mm.

Specifically, the radius R of the circular arc surface 31 may be 0.5 mm, 0.6 mm, 1.2 mm, 1.5 mm, etc., which will not be limited in the embodiments of the present application. When the radius R of the circular arc surface 31 is less than 0.5 mm, the cell-side tab 213 and the corner tab 215 still have a large contact area with the circular arc surface 31, thereby greatly reducing the improvement effect on the breakage and cracking of the tabs 210. When the radius R of the circular arc surface 31 is greater than 1.5 mm, the outer dimensions of the ultrasonic welding head 100 will be too large, so that the manufacturing cost of the ultrasonic welding head 100 is increased and the improvement effect is not significant.

In this way, when the radius R of the circular arc surface 31 is in the range of 0.5 mm to 1.5 mm, the contact area between the tabs 210 and the circular arc surface 31 is small during the ultrasonic welding, so that the tabs 210 are less likely to be subjected to undesirable phenomena such as breakage or cracking due to friction during the ultrasonic welding.

Figure 12:
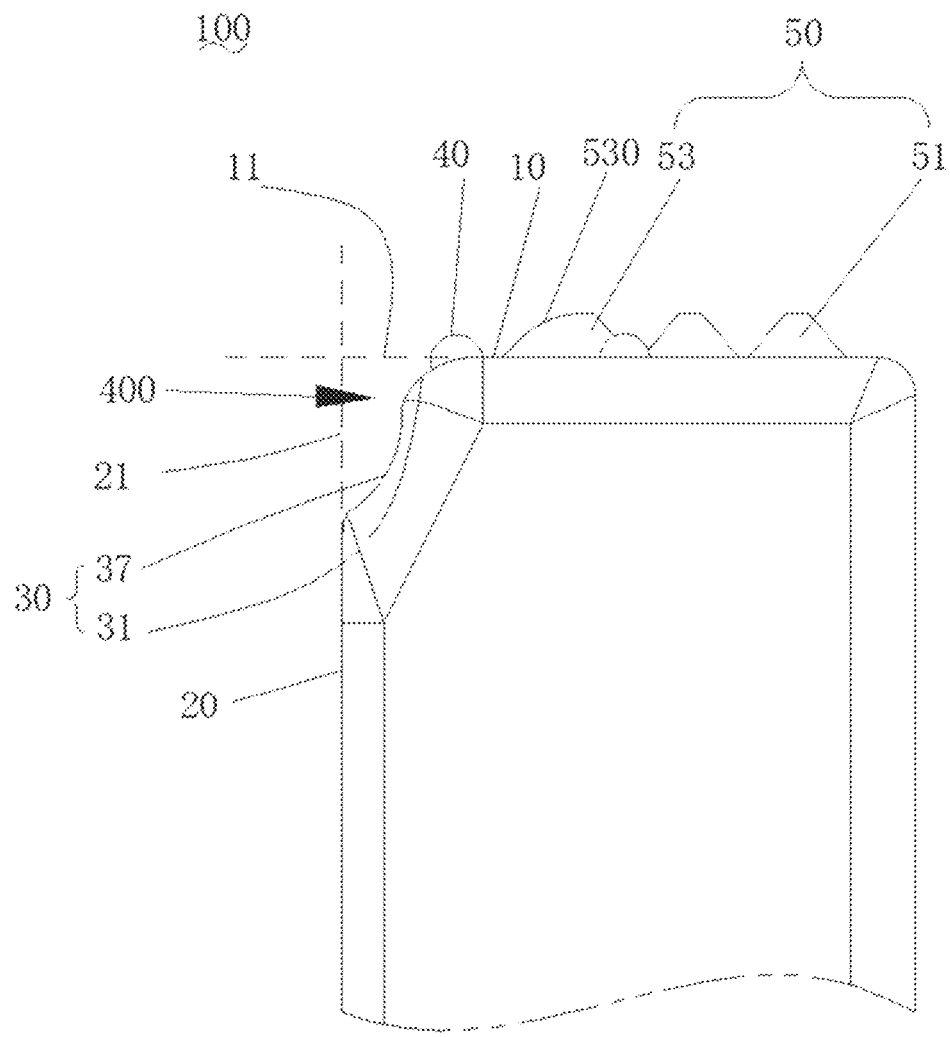
FIG. 12 is a schematic structural diagram of an ultrasonic welding head according to some embodiments of the present application.
Figure 13:
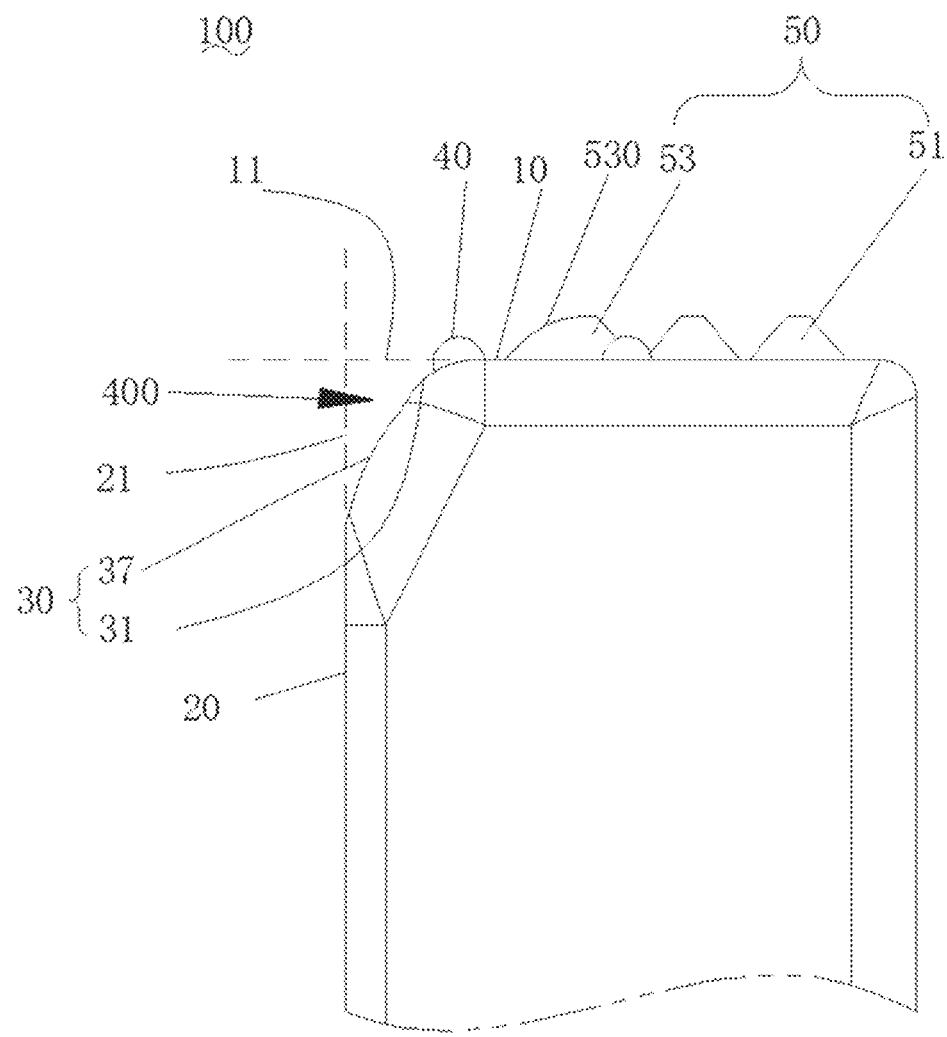
FIG. 13 is a schematic structural diagram of an ultrasonic welding head according to some embodiments of the present application.

According to some embodiments of the present application, optionally, referring further to FIGS. 4 and 9 to 13, FIG. 11 is a schematic structural diagram of an ultrasonic welding head 100 according to some embodiments of the present application, FIG. 12 is a schematic structural diagram of an ultrasonic welding head 100 according to some embodiments of the present application, and FIG. 13 is a schematic structural diagram of an ultrasonic welding head 100 according to some embodiments of the present application. A second welding tooth 40 is provided on the circular arc surface 31.

Specifically, as shown in FIGS. 9 to 13, the second welding tooth 40 may be a pyramid, a sphere, a mixture of the two, etc. The specific shape of the second welding tooth 40 is not limited in the embodiments of the present application. Optionally, the second welding tooth 40 is a sphere. There may be a plurality of second welding teeth 40, and the plurality of second welding teeth 40 are arranged at intervals on the circular arc surface 31. Taking the second welding tooth 40 defined as a pyramid as an example, a height direction of the second welding tooth 40 may be arranged perpendicular to a normal direction of the circular arc surface 31.

In this way, the second welding tooth 40 can pre-press and shape the tabs 210 in advance before the high-frequency vibration of the ultrasonic welding head 100. Since the tabs 210 are in a stacked structure and are in a fluffy state in the surface region, the second welding tooth 40 can compress the tabs 210 in the fluffy state. Moreover, with the provision of the second welding tooth 40, it is also possible to change the friction between the tabs 210 and the circular arc surface 31 from the original large-plane friction to a small-plane friction, so that the overall friction area between the tabs 210 and the ultrasonic welding head 100 can be reduced, and the tabs 210 are less likely to be subjected to undesirable phenomena such as breakage or cracking due to friction during the ultrasonic welding.

According to some embodiments of the present application, optionally, referring further to FIGS. 2, 3, 4 and 10, a projection of the avoidance surface 33 on a first plane 500 has a height H4 ranging from 0.5 mm to 2 mm. The first plane 500 is perpendicular to the welding surface 10. A projection of the avoidance surface 33 on a second plane 600 has a width D6 ranging from 0.5 mm to 1.5 mm. The second plane 600 is parallel to the welding surface 10.

Specifically, taking the ultrasonic welding head 100 defined as a cuboid as an example, the welding surface 10 corresponds to the top surface. The first plane 500 may be a plane parallel to the peripheral surface of the short side, that is, perpendicular to the top surface. The height of the projection of the avoidance surface 33 refers to the dimension of the orthographic projection of the avoidance surface 33 relative to the first plane 500. The height H4 of the projection of the avoidance surface 33 may be 0.5 mm, 0.8 mm, 1.5 mm, 2 mm, etc., which will not be limited in the embodiments of the present application. When the height H4 of the projection is less than 0.5 mm, the cell-side tab 213 and the corner tab 215 still have a large contact area with the avoidance surface 33, thereby greatly reducing the improvement effect on the breakage and cracking of the tabs 210. When the height H4 of the projection is greater than 2 mm, the outer dimensions of the ultrasonic welding head 100 will be too large, so that the manufacturing cost of the ultrasonic welding head 100 is increased and the improvement effect is not significant. Here, the side surface 20 can be understood as any one of the peripheral surfaces, or all the peripheral surfaces.

Similarly, the second plane 600 may be a plane parallel to the top surface, and the width D6 of the projection of the avoidance surface 33 refers to the dimension of the orthographic projection of the avoidance surface 33 relative to the second plane 600. Specifically, the width D6 of the projection of the avoidance surface 33 may be 0.5 mm, 0.8 mm, 1.5 mm, etc., which will not be limited in the embodiments of the present application. When the width D6 of the projection is less than 0.5 mm, the cell-side tab 213 and the corner tab 215 still have a large contact area with the avoidance surface 33, thereby greatly reducing the improvement effect on the breakage and cracking of the tabs 210. When the width D6 of the projection is greater than 2 mm, the outer dimensions of the ultrasonic welding head 100 will be too large, so that the manufacturing cost of the ultrasonic welding head 100 is increased and the improvement effect is not significant.

In this way, when the projection of the avoidance surface 33 on the first plane 500 has a height H4 ranging from 0.5 mm to 2 mm, the contact area between the avoidance surface 33 and the tabs 210 is small in a direction in which the avoidance surface and the tabs are parallel to each other, so that the tabs 210 are less likely to be subjected to undesirable phenomena such as breakage or cracking due to friction during the ultrasonic welding. When the projection of the avoidance surface 33 on the second plane 600 has a width D6 ranging from 0.5 mm to 1.5 mm, the contact area between the avoidance surface 33 and the tabs 210 is small in a direction in which the avoidance surface and the tabs form an angle with each other, so that the tabs 210 are less likely to be subjected to undesirable phenomena such as breakage or cracking due to friction during the ultrasonic welding.

According to some embodiments of the present application, optionally, referring further to FIGS. 2, 4 and 11 to 13, the surface form of the connection surface 30 comprises at least one of an inclined surface 35 and an arc-shaped surface 37. When the surface form of the connection surface 30 comprises an inclined surface 35, the inclined surface 35 is inclined relative to the welding surface 10.

Specifically, as shown in FIG. 5, the avoidance surface 33 may be an inclined surface 35, and as shown in FIGS. 6 and 7, the avoidance surface 33 may alternatively be an arc-shaped surface 37. Of course, the avoidance surface 33 may also be a combination of an inclined surface 35 and an arc-shaped surface 37. For example, the avoidance surface 33 at the end close to the circular arc surface 31 may be an inclined surface 35, and the avoidance surface 33 at the end away from the circular arc surface 31 and close to the side surface 20 may be an arc-shaped surface 37.

By "the inclined surface 35 is inclined relative to the welding surface 10", it is meant that there is a certain angle between the inclined surface 35 and the welding surface 10, and the angle is not a right angle.

In this way, by arranging the inclined surface 35 and the welding surface 10 in an inclined state, it is possible that during the high-frequency vibration of the ultrasonic welding head 100, the contact area between the ultrasonic welding head 100 and the tabs 210 becomes smaller, so that the tabs 210 are less likely to be subjected to undesirable phenomena such as breakage or cracking due to friction during the ultrasonic welding.

It can be understood that in some embodiments, the avoidance surface 33 may also be arc-shaped as a whole.

Figure 14:
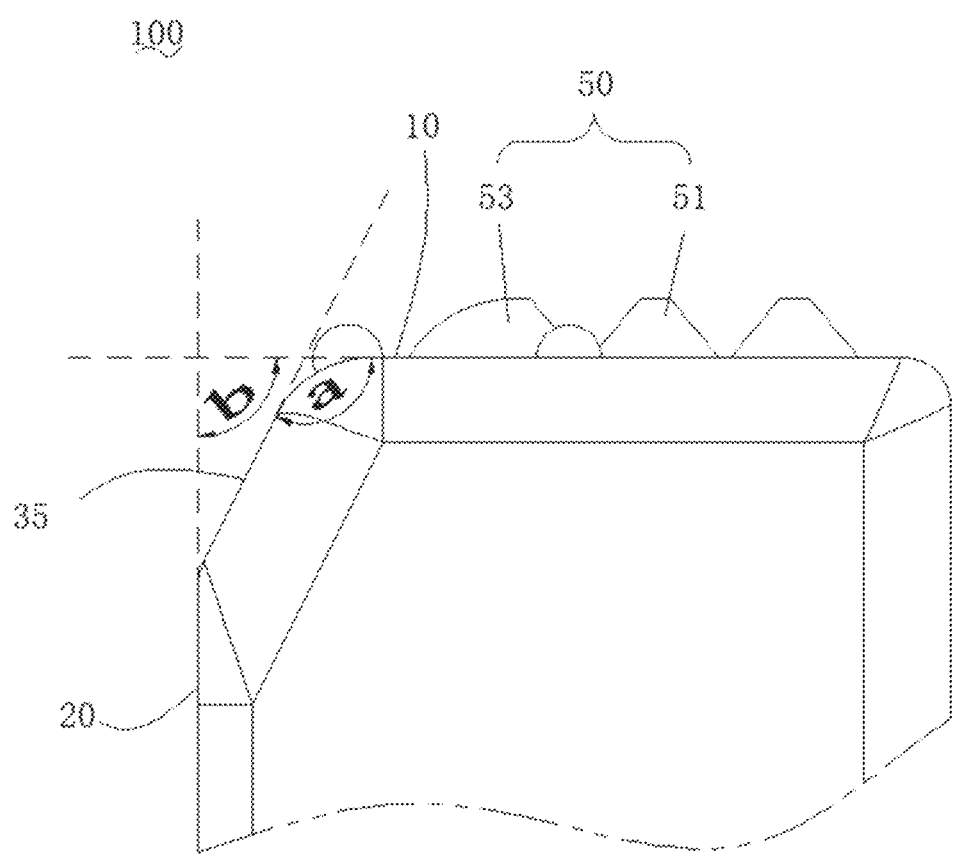
FIG. 14 is a schematic structural diagram of an ultrasonic welding head according to some embodiments of the present application.

According to some embodiments of the present application, optionally, referring further to FIGS. 2, 4 and 14, FIG. 14 is a schematic structural diagram of an ultrasonic welding head 100 according to some embodiments of the present application. When the surface form of the connection surface 30 comprises an inclined surface 35, an included angle a between the inclined surface 35 and the welding surface 10 is greater than an included angle b between the welding surface 10 and the side surface 20.

Specifically, the included angle a between the inclined surface 35 and the welding surface 10 is an angle between a plane of the extension direction of the inclined surface 35 toward the welding surface 10 and a plane of the extension direction of the welding surface 10 toward the inclined surface 35. Similarly, the included angle b between the welding surface 10 and the side surface 20 may be an angle between a plane of the extension direction of the welding surface 10 toward the side surface 20 and a plane of the extension direction of the side surface 20 toward the welding surface 10. It is worth noting that the angle is selected as an angle less than 180 degrees among the included angles between the planes.

In this way, compared to when the included angle a between the inclined surface 35 and the welding surface 10 is less than or equal to the included angle b between the welding surface 10 and the side surface 20, the included angle a between the inclined surface 35 and the welding surface 10 is set to be greater than the included angle b between the welding surface 10 and the side surface 20 to make the contact area between an avoidance space 400 and the ultrasonic welding head 100 is smaller, so that the tabs 210 are less likely to be subjected to undesirable phenomena such as breakage or cracking due to friction during the ultrasonic welding.

According to some embodiments of the present application, optionally, referring further to FIGS. 4 and 14, the included angle a between the inclined surface 35 and the welding surface 10 is an obtuse angle, and the side surface 20 is perpendicular to the welding surface 10.

Specifically, when the included angle a between the inclined surface 35 and the welding surface 10 is an obtuse angle, the included angle b between the welding surface 10 and the side surface 20 is a right angle.

In this way, when the included angle a between the inclined surface 35 and the welding surface 10 is an obtuse angle, if the side surface 20 is not perpendicular to the welding surface 10, it will cause the side surface 20 to cut the tabs, so that the tabs are subjected to undesirable phenomena such as breakage or cracking due to friction with the side surface 20.

According to some embodiments of the present application, optionally, referring further to FIGS. 2 to 10 and 15, FIG. 15 is a schematic structural diagram of an ultrasonic welding head 100 according to some embodiments of the present application. A second welding tooth 40 is arranged at a connection between the connection surface 30 and the welding surface 10.

Specifically, the "connection" refers to a region where the intersection between the connection surface 30 and the welding surface 10 is located. Optionally, the second welding tooth 40 may be distributed in a region of the connection surface 30 that is close to the welding surface 10, and its height may be in the normal direction of the circular arc surface 31 or the avoidance surface 33. The second welding tooth 40 may also be located in a region of the welding surface 10 that is close to the connection surface 30, and its height may be in the normal direction of the welding surface 10. Further, the second welding tooth 40 is close to the corner tab 215 and the cell-side tab 213.

There may be a plurality of second welding teeth 40, and the plurality of second welding teeth 40 are arranged at intervals at the connection between the connection surface 30 and the welding surface 10. The intervals between the second welding teeth 40 may be equal. For example, the interval between adjacent second welding teeth 40 is fixed at 2 mm. The intervals between the second welding teeth 40 may also be non-equal. Taking the ultrasonic welding head 100 defined as a cuboid as an example, the top surface corresponds to the welding surface 10. In a length direction of the top surface, a distance between two adjacent second welding teeth 40 may be D1 and D2, where D1 is the distance between two adjacent second welding teeth 40 that are not at the vertices in the length direction of the top surface, and D2 is the distance between a second welding tooth 40 that is at a vertex in the length direction of the top surface and a second welding tooth 40 at the adjacent long side. Optionally, D2=1.5D1.

In this way, the second welding tooth 40 can pre-press and shape the tabs 210 in advance before the high-frequency vibration of the ultrasonic welding head 100. Since the tabs 210 are in a stacked structure and are in a fluffy state in the surface region, the second welding tooth 40 can compress the tabs 210 in the fluffy state. Moreover, with the provision of the second welding tooth 40, it is also possible to change the friction between the tabs 210 and a connection region between the connection surface 30 and the welding surface 10 from the original large-plane friction to a small-plane friction, so that the overall friction area between the tabs 210 and the ultrasonic welding head 100 can be reduced, and the tabs 210 are less likely to be subjected to undesirable phenomena such as breakage or cracking due to friction during the ultrasonic welding.

According to some embodiments of the present application, optionally, referring further to FIGS. 2 to 9, the second welding tooth 40 is arranged at a connection line between the connection surface 30 and the welding surface 10.

Specifically, the connection line between the connection surface 30 and the welding surface 10 may be a surface intersection line of the welding surface 10 and the connection surface 30. Taking the second welding tooth 40 defined as a pyramid as an example, the bottom center of the pyramid may be located on the intersection line which may be perpendicular to a connection line between the bottom center and the top center of the pyramid. In this way, by arranging the second welding tooth 40 at the connection line between the connection surface 30 and the welding surface 10, the second welding tooth 40 can fully pre-press and shape the tabs 210 before the ultrasonic welding. When the ultrasonic welding head 100 approaches the pressure-side tab 211, compared with other positions, the second welding tooth 40 at the connection line may first come into contact with the pressure-side tab 211, so that the tab 210 can be pre-pressed and shaped faster.

Figure 10:
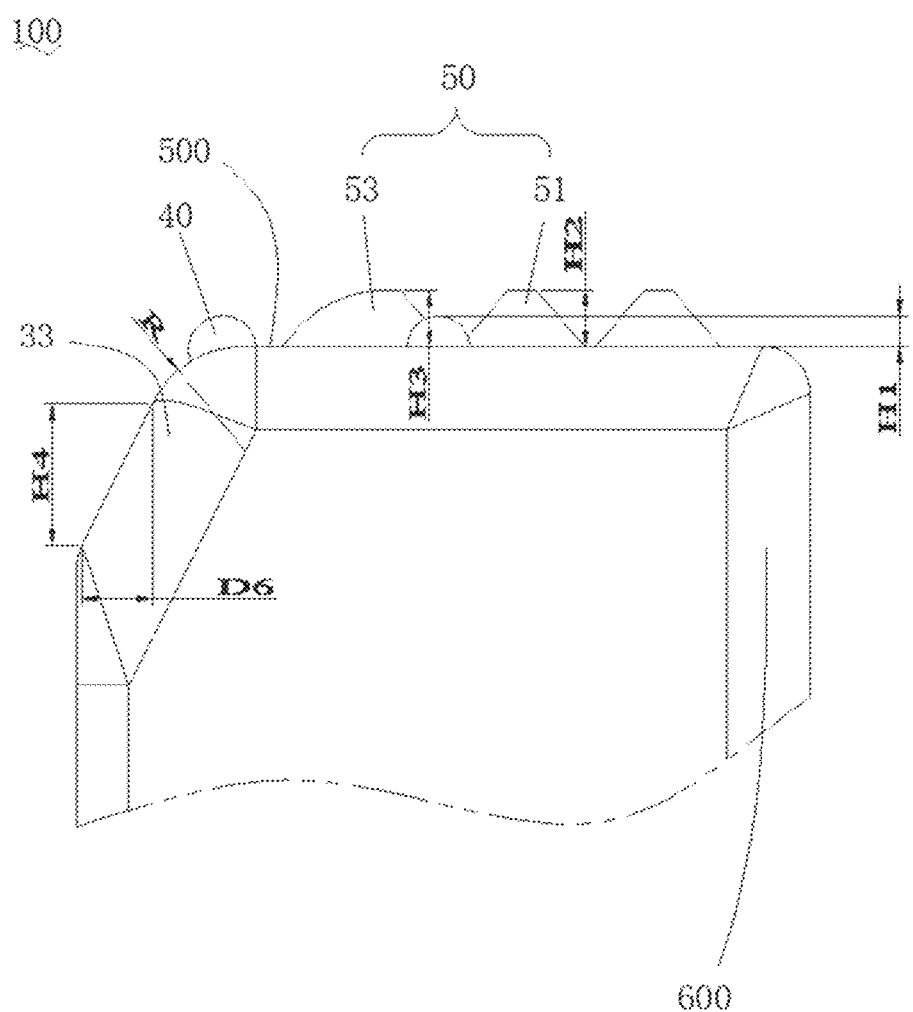
FIG. 10 is a schematic structural diagram of an ultrasonic welding head according to some embodiments of the present application.
Figure 11:
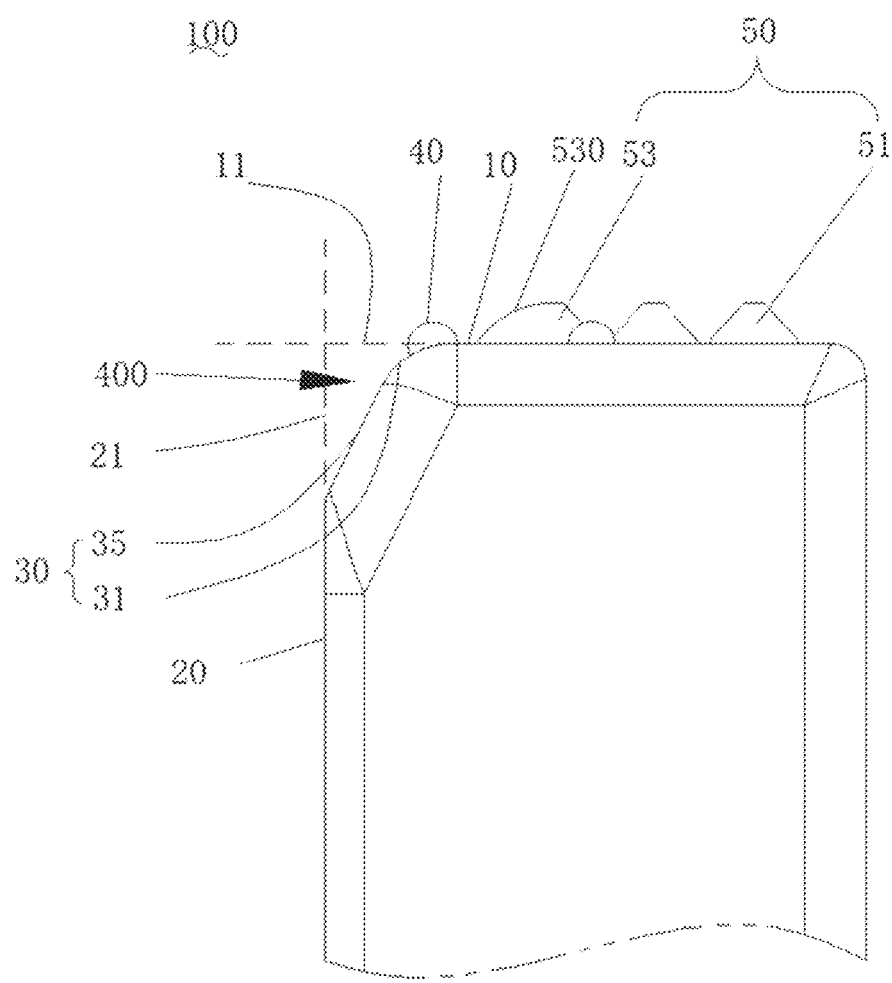
FIG. 11 is a schematic structural diagram of an ultrasonic welding head according to some embodiments of the present application.

According to some embodiments of the present application, optionally, referring further to FIG. 2 and FIG. 10, the height of the first welding tooth 50 is greater than the height H1 of the second welding tooth 40.

Specifically, by "the height of the first welding tooth 50 is greater than the height H1 of the second welding tooth 40" refers to the heights of the first welding tooth 50 and the second welding tooth 40 in the normal direction of the welding surface 10. Optionally, in some embodiments, when the first welding tooth 50 has a plurality of heights, what is meant here is that the lowest height of the first welding tooth 50 is less than the height H1 of the second welding tooth 40. The height of the welding tooth specifically refers to the height of the welding tooth protruding from the welding surface 10.

In this way, the height of the first welding tooth 50 being greater than that of the second welding tooth 40 can prevent the second welding tooth 40 from affecting the contact between the first welding tooth 50 and the tabs 210, thereby avoiding false welding.

According to some embodiments of the present application, optionally, referring further to FIGS. 2 and 4 to 9, there are a plurality of first welding teeth 50 and a plurality of second welding teeth 40, the plurality of first welding teeth 50 are arranged at intervals in a matrix, and at least one of the second welding teeth 40 is located at an extension of a gap between two adjacent first welding teeth 50.

There may be a plurality of second welding teeth 40. For example, the number of second welding teeth 40 is five, six, seven or more. The specific number of second welding teeth 40 will not limited in the embodiments of the present application. Similarly, there may be a plurality of first welding teeth 50. For example, the number of first welding teeth 50 is five, six, seven or more. The specific number of first welding teeth 50 will not limited in the embodiments of the present application.

By "arranged at intervals in a matrix" means that the first welding teeth 50 are arranged in the form of a matrix array. The gap between two adjacent first welding teeth 50 extends in the direction of the second welding tooth 40 and passes through the second welding tooth 40.

Taking the ultrasonic welding head 100 defined as a cuboid as an example, the top surface corresponds to the welding surface 10, the first welding teeth 50 are arranged at intervals on the top surface and protrude from the top surface, and the interval between adjacent first welding teeth 50 in the width direction is D3, and the interval between adjacent first welding teeth 50 in the length direction is D4. Optionally, D4 is greater than D3. Such a configuration facilitates the production and manufacturing, and more first welding teeth 50 can be arranged on the welding surface 10, thereby improving the efficiency of ultrasonic welding.

In this way, the plurality of second welding teeth 40 can pre-press and shape the contact region between the ultrasonic welding head 100 and the tabs 210 in advance to ensure the flatness of the surfaces of the tabs 210, the plurality of first welding teeth 50 can improve the welding efficiency of the ultrasonic welding head 100 to the tabs 210, and the positioning of a second welding tooth 40 between two adjacent first welding teeth 50 can optimize the space occupation of the ultrasonic welding head 100, thereby reducing the overall size of the ultrasonic welding head 100 and reducing the production and manufacturing costs of the ultrasonic welding head 100.

According to some embodiments of the present application, optionally, referring further to FIGS. 2 and 5, in some embodiments, the second welding tooth 40 has a spherical shape.

Specifically, the spherical shape may be the cross-sectional shape of the second welding tooth 40, and the second welding tooth 40 may be a hemisphere, a sphere, a spheroid, etc. When the second welding tooth 40 is spherical, the second welding tooth 40 can change the friction between the tabs 210 and the connection surface 30 from the original large-plane friction to spherical friction. Compared with a non-spherical second welding tooth 40, this can reduce the overall friction area between the tabs 210 and the ultrasonic welding head 100, and can also weaken the cutting effect between the ultrasonic welding head 100 and the tabs 210, so that the tabs 210 are less likely to be subjected to undesirable phenomena such as breakage or cracking due to friction during the ultrasonic welding.

According to some embodiments of the present application, optionally, referring further to FIGS. 2 to 5, the first welding tooth 50 comprises a first tooth 51 and a second tooth 53 arranged spaced apart from the first tooth 51, the second tooth 53 is arranged closer to the connection surface 30 than the first tooth 51, and a contact area between the second tooth 53 and the members to be welded 201 is greater than a contact area between the first tooth 51 and the members to be welded 201.

Specifically, the first tooth 51 may be a welding tooth among the first welding teeth 50 that is not provided with a space-keeping structure, and the second tooth 53 may be a welding tooth among the first welding teeth 50 that is provided with a space-keeping structure. Taking the ultrasonic welding head 100 defined as a cuboid as an example, the top surface corresponds to the welding surface 10. A distance D4 between the first tooth 51 and the second tooth 53 adjacent to each other may be less than the distance D1 between two adjacent second welding teeth 40. In the width direction of the top surface, the distance between two adjacent second welding teeth 40 may be equal to D2.

By "the second tooth 53 is closer to the connection surface 30 than the first tooth 51", it is meant that a projection distance of the second tooth 53 on the connection surface 30 is less than that of the first tooth 51. Taking the first tooth 51 defined as a pyramid as an example, on the basis of the first tooth 51, material is removed along a certain path from the top surface of the pyramid toward the bottom surface. A pyramid-like body obtained after the material is removed is the second tooth 53.

Taking the second tooth 53 defined as a pyramid as an example, the bottom surface of the pyramid is located on the welding surface 10, and the top surface protrudes from the welding surface 10. The cross-sectional area of the second tooth 53 may be the cross-sectional area of the side surface 20 of the pyramid. Optionally, the length L3 of the bottom surface of the second tooth 53 is greater than the length L4 of the top surface of the second tooth 53. It can be understood that if L3=L4, the second tooth 53 cannot penetrate through the tabs 210, thereby causing false welding. Similarly, taking the first tooth 51 defined as a pyramid as an example, the bottom surface of the pyramid is located on the welding surface 10, and the top surface protrudes from the welding surface 10. Optionally, the length L2 of the top surface of the first tooth 51 is equal to the length L4 of the top surface of the second tooth 53, the width W2 of the top surface of the first tooth 51 is equal to the width W4 of the top surface of the second tooth 53, the height H2 of the first tooth 51 is equal to the height H3 of the second tooth 53, the heights H2 and H3 of the first welding tooth 50 are greater than the height H1 of the second welding tooth 40, and H1=0.4H2=0.4H3.

It can be understood that in a direction perpendicular to the welding surface 10, the cross-sectional area of the second tooth 53 gradually decreases, making the transition of the second tooth 53 in this direction smoother, thereby reducing the friction tearing force from the second tooth 53 on the tab 210 during the welding, and thus alleviating the undesirable phenomena such as breakage or cracking of the tab 210 due to friction during the ultrasonic welding.

In this way, the second tooth 53 is arranged closer to the connection surface 30 and the contact area between the second tooth 53 and the members to be welded 201 is greater than the contact area between the first tooth 51 and the members to be welded 201, so that the tab 210 in contact with the second tooth 53 can be stretched, in other words the length of the tab 210 participating in the ultrasonic vibration increases. It can be understood that since the area increases and the pressing forces from the first tooth 51 and the second tooth 53 are constant, the pressure on the tab 210 in contact with the second tooth 53 becomes smaller, thereby reducing the friction tearing force from the ultrasonic welding head 100 on the tab 210 during the welding, and thus alleviating the undesirable phenomena such as breakage or cracking of the tab 210 due to friction during the ultrasonic welding.

Figure 17:
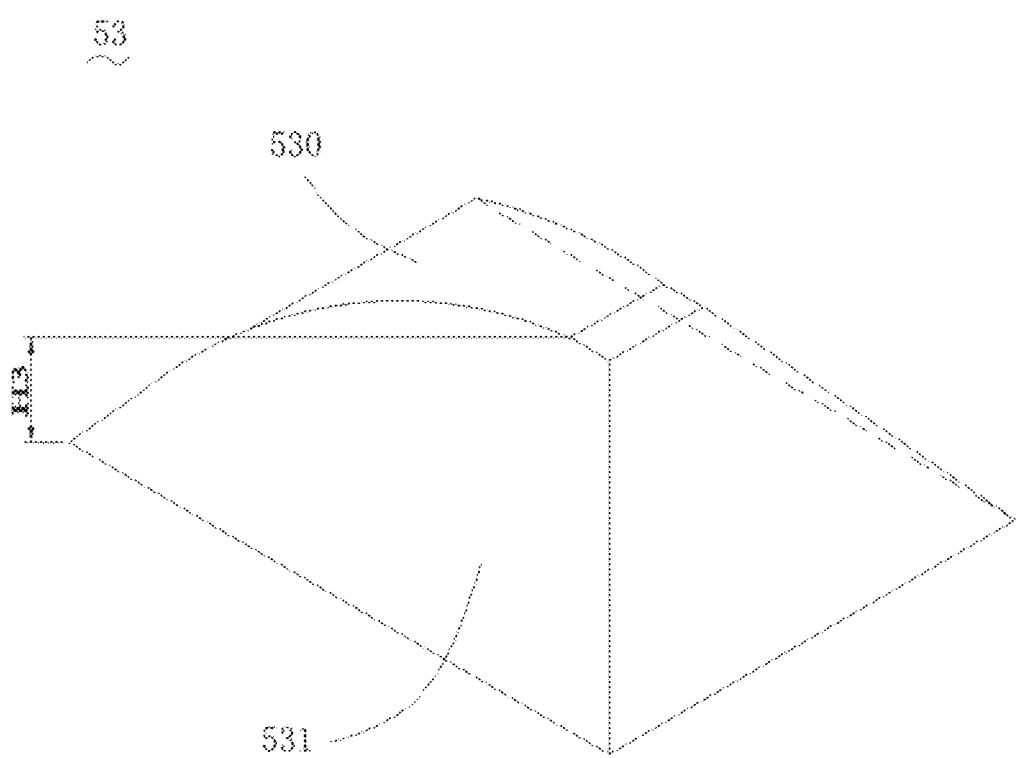
FIG. 17 is a schematic structural diagram of a second tooth according to some embodiments of the present application.

According to some embodiments of the present application, optionally, referring further to FIGS. 2 to 4, 16 and 17, FIG. 16 is a schematic structural diagram of a first tooth 51 according to some embodiments of the present application, and FIG. 17 is a schematic structural diagram of a second tooth 53 according to some embodiments of the present application. The first tooth 51 comprises a first connection surface 510 connected to the welding surface 10, the second tooth 53 comprises a second connection surface 531 connected to the welding surface 10, the first welding tooth 50 comprises a first tooth 51 and a second tooth 53 arranged spaced apart from the first tooth 51, the second tooth 53 is arranged closer to the connection surface 30 than the first tooth 51, and the second connection surface 531 has an area greater than that of the first connection surface area 510.

Specifically, reference is made to the first tooth and the second tooth in the above embodiments. The first connection surface 510 may refer to the bottom surface of the aforementioned pyramid. Similarly, the first connection surface 510 may refer to the bottom surface of the aforementioned pyramid-like body. The area of the second connection surface 531 and the area of the first connection surface 510 may be the areas of the aforementioned two bottom surfaces.

In this way, the welding area of the second tooth 53 is large, the contact between the second tooth 53 and the pressure-side tab 211 is more stable, and the stress in the contact region between the tab 210 and the second tooth 53 is reduced.

According to some embodiments of the present application, optionally, referring further to FIGS. 2 to 5, the space-keeping surface 530 is oriented in the same direction as the connection surface 30.

Specifically, taking the first tooth 51 defined as a pyramid as an example, on the basis of the first tooth 51, material is removed along a certain path from the top surface of the pyramid toward the bottom surface. A pyramid-like body obtained after the material is removed is the second tooth 53. Further, the space-keeping surface 530 may be a surface formed after the removal of the material. By "the space-keeping surface 530 is oriented in the same direction as the connection surface 30", it is meant that the space-keeping surface 530 is not perpendicular to the connection surface 30, or that the normals of the space-keeping surface 530 and the connection surface 30 are not perpendicular to each other and the normals of the two surfaces both intersect with the members to be welded 201.

In this way, compared with the first tooth 51 without a space-keeping surface 530, during the welding, the contact area between the second tooth 53 and the members to be welded 201 is larger, so that the tab 210 in contact with the second tooth 53 can be stretched, in other words the length of the tab 210 participating in the ultrasonic vibration increases. It can be understood that since the area increases and the pressing forces from the first tooth 51 and the second tooth 53 are constant, the pressure on the tab 210 in contact with the second tooth 53 becomes smaller. In addition, the space-keeping surface 530 can reduce the contact area between the second tooth 53 and the non-welding region of the tab 210, thereby reducing the friction tearing force from the ultrasonic welding head 100 on the tab 210 during the welding, and thus alleviating the undesirable phenomena such as breakage or cracking of the tab 210 due to friction during the ultrasonic welding.

According to some embodiments of the present application, optionally, referring further to FIGS. 2 and 5 to 9, an extension direction of an intersection line between the welding surface 10 and the connection surface 30 is a first direction e, a second direction f is perpendicular to the first direction e, and the centers of the first tooth 51 and the second tooth 53 are aligned with each other in the second direction f.

Specifically, taking the ultrasonic welding head 100 defined as a cuboid as an example, the top surface corresponds to the welding surface 10. The aligned centers of the first tooth 51 and the second tooth 53 may be the center of the rectangular top surface. The first direction e may be a linear direction where a long side of the cuboid is located, or the length direction of the cuboid. The second direction f may be a linear direction where a short side of the cuboid is located, or the width direction of the cuboid.

In this way, during the ultrasonic welding, the welded parts of the tabs 210 are vibrated uniformly and are less likely to be subjected to undesirable phenomena such as breakage or cracking.

Figure 15:
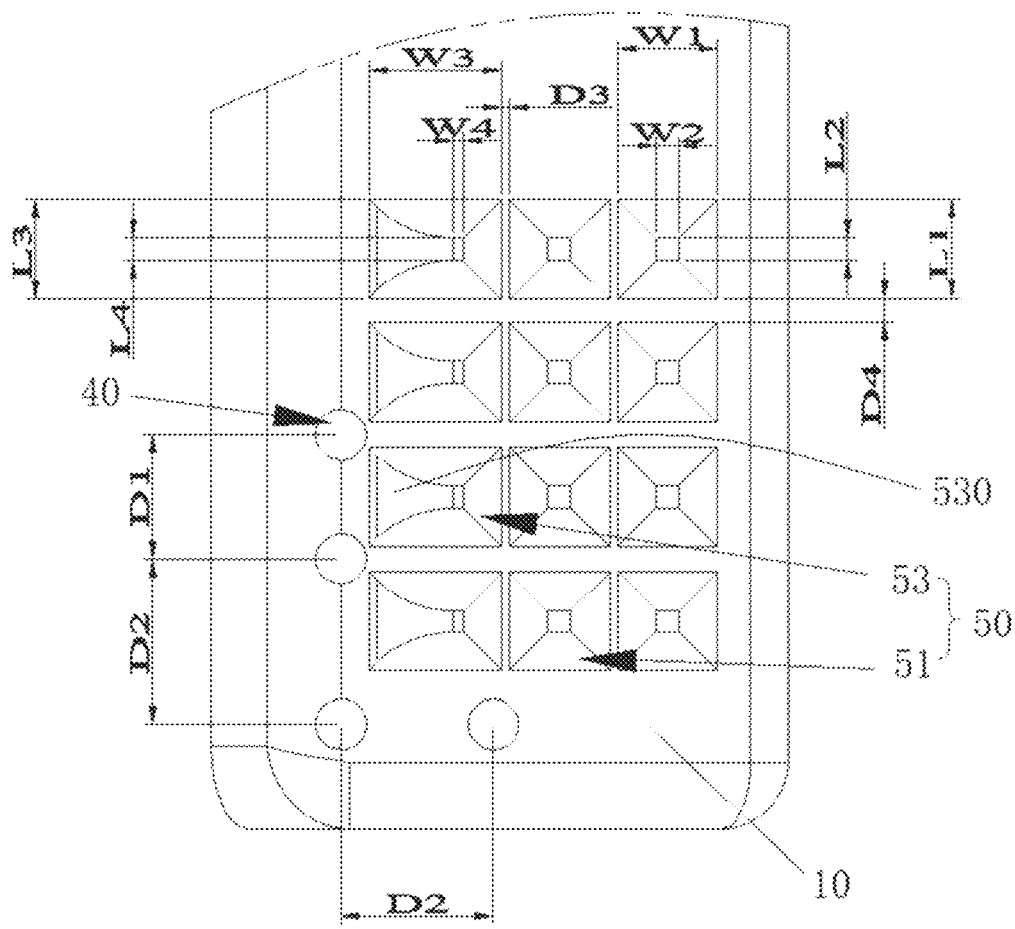
FIG. 15 is a schematic structural diagram of an ultrasonic welding head according to some embodiments of the present application.
Figure 16:
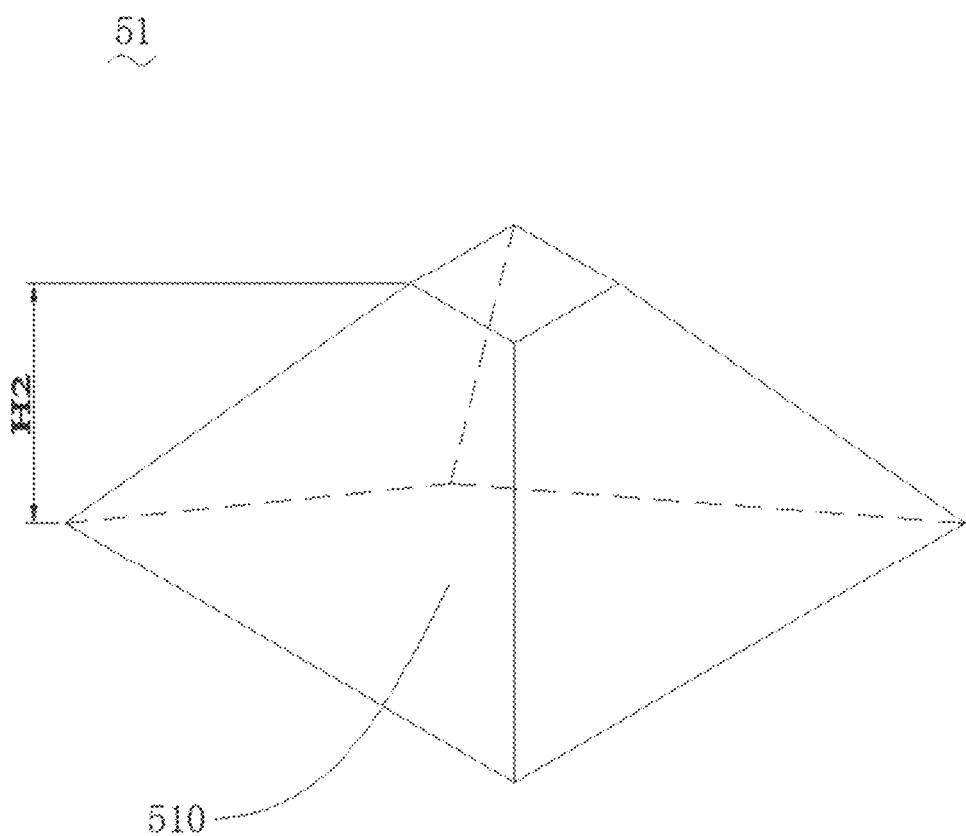
FIG. 16 is a schematic structural diagram of a first tooth according to some embodiments of the present application.

According to some embodiments of the present application, optionally, referring further to FIG. 15, in the second direction f, the first tooth 51 has a dimension less than that of the second tooth 53; and in the first direction e, the first tooth 51 has a dimension equal to that of the second tooth 53.

Taking the ultrasonic welding head 100 defined as a cuboid and the first tooth 51 and the second tooth 53 both defined as pyramids as an example, the top surface of the cuboid corresponds to the welding surface 10. Optionally, in the width direction of the welding surface 10, W3=1.5W1, where W3 and W1 are the dimensions of the bottom surfaces of the second tooth 53 and the first tooth 51, respectively. In the length direction of the welding surface 10, L1=L3, where L1 and L3 are the dimensions of the bottom surfaces of the second tooth 53 and the first tooth 51, respectively.

In this way, the dimension of the second tooth 53 in the second direction f is greater than that of the first tooth 51, making it easier to perform further machining on the second tooth 53, so as to create a space-keeping structure on the second tooth 53. The dimension of the second tooth 53 in the length direction is equal to that of the first tooth 51, so that the space of the welding surface 10 is effectively utilized.

Referring further to FIGS. 1 and 7, in a second aspect, the present application provides a welding device 1000, comprising an ultrasonic welding head 100 in the foregoing embodiments. The ultrasonic welding head 100 may have a second welding tooth 40 defined as a sphere and a first welding tooth 50 defined as a pyramid, that is, the ultrasonic welding head 100 shown in FIG. 9.

Referring further to FIGS. 2 to 5, according to some embodiments of the present application, an ultrasonic welding head 100 is provided. The ultrasonic welding head 100 comprises a welding surface 10, a side surface 20 and a connection surface 30, and an avoidance space 400 is defined between the three surfaces, thereby reducing the contact area between the side surface 20 of the ultrasonic welding head 100 and a corner tab 215 and a cell-side tab 213. A second welding tooth 40 is provided on the connection surface 30, and the second welding tooth 40 may pre-press and shape the tabs 210 in advance before high-frequency vibration of the ultrasonic welding head 100, so as to compress the corner tab 215 and the cell-side tab 213 in a fluffy state. A first welding tooth 50 is provided on the welding surface 10, and the first welding tooth 50 is configured to directly participate in ultrasonic welding. The first welding tooth 50 comprises a first tooth 51 and a second tooth 53, and the second tooth 53 is designed to have a space-keeping structure, so as to reduce the frictional forces from the first welding tooth 50 near the corner tab 215 and the cell-side tab 213 to the tabs 210 in this region. Through the aforementioned ultrasonic welding head 100, the friction areas between the corner tab 215 and the cell-side tab 213 and the side surface 20 during welding can be greatly reduced. Moreover, when friction still occurs, the arrangement of the second welding tooth 40 and the second tooth 53 can reduce the friction areas between the corner tab 215 and the cell-side tab 213 and the ultrasonic welding head 100, and reduce the magnitudes of the frictional forces between the corner tab 215 and the cell-side tab 213 and the ultrasonic welding head 100, thereby alleviating the undesirable phenomena such as breakage or cracking of the corner tab 215 and the cell-side tab 213 due to friction during the ultrasonic welding, and improving the quality of the ultrasonic welding.

Finally, it should be noted that the above embodiments are merely used for illustrating rather than limiting the technical solutions of the present application. Although the present application has been illustrated in detail with reference to the foregoing embodiments, it should be understood by those of ordinary skill in the art that the technical solutions described in the foregoing embodiments may still be modified, or some or all of the technical features thereof may be equivalently substituted; and such modifications or substitutions do not make the essence of the corresponding technical solution depart from the scope of the technical solutions of the embodiments of the present application, and should fall within the scope of the claims and the description of the present application. In particular, the technical features mentioned in the embodiments can be combined in any manner, provided that there is no structural conflict. The present application is not limited to the specific embodiments disclosed herein but includes all the technical solutions that fall within the scope of the claims.

The invention claimed is:

1. An ultrasonic welding head, comprising:
    a welding surface provided with a first welding tooth, the first welding tooth being configured to weld members to be welded; and
    a side surface having an extension direction which intersects an extension direction of the welding surface;
    wherein the ultrasonic welding head further comprises a connection surface which is connected to the welding surface and the side surface, so as to avoid the members to be welded,
    the connection surface is in smooth transition connection with the welding surface, and
    the connection surface comprises a circular arc surface and an avoidance surface, the circular arc surface is connected to the avoidance surface and the welding surface, and the circular arc surface is tangent to the welding surface.

2. The ultrasonic welding head according to claim 1, wherein the circular arc surface has a radius ranging from 0.5 mm to 1.5 mm.

3. The ultrasonic welding head according to claim 1, wherein a second welding tooth is provided on the circular arc surface.

4. The ultrasonic welding head according to claim 1, wherein a projection of the avoidance surface on a first plane has a height ranging from 0.5 mm to 2 mm, the first plane being perpendicular to the welding surface; and/or
    a projection of the avoidance surface on a second plane has a width ranging from 0.5 mm to 1.5 mm, the second plane being parallel to the welding surface.

5. The ultrasonic welding head according to claim 1, wherein the surface form of the connection surface comprises at least one of an inclined surface and an arc-shaped surface, the inclined surface being inclined relative to the welding surface.

6. The ultrasonic welding head according to claim 5, wherein when the surface form of the connection surface comprises an inclined surface, an included angle between the inclined surface and the welding surface is greater than an included angle between the welding surface and the side surface.

7. The ultrasonic welding head according to claim 6, wherein the included angle between the inclined surface and the welding surface is an obtuse angle, and the side surface is perpendicular to the welding surface.

8. The ultrasonic welding head according to claim 1, wherein a second welding tooth is arranged at a connection between the connection surface and the welding surface.

9. The ultrasonic welding head according to claim 8, wherein the second welding tooth is arranged at a connection line between the connection surface and the welding surface.

10. The ultrasonic welding head according to claim 3, wherein the first welding tooth has a height greater than a height of the second welding tooth.

11. The ultrasonic welding head according to claim 10, wherein there are a plurality of first welding teeth and a plurality of second welding teeth, the plurality of first welding teeth are arranged at intervals in a matrix, and at least one of the second welding teeth is located at an extension of a gap between two adjacent first welding teeth.

12. The ultrasonic welding head according to claim 3, wherein the second welding tooth has a spherical shape.

13. The ultrasonic welding head according to claim 1, wherein the first welding tooth comprises a first tooth and a second tooth arranged spaced apart from the first tooth, the second tooth is arranged closer to the connection surface than the first tooth, and a contact area between the second tooth and the members to be welded is greater than a contact area between the first tooth and the members to be welded.

14. The ultrasonic welding head according to claim 13, wherein the first tooth comprises a first connection surface connected to the welding surface, the second tooth comprises a second connection surface connected to the welding surface, and the area of the second connection surface is greater than that of the first connection surface.

15. The ultrasonic welding head according to claim 13, wherein the second tooth comprises a space-keeping surface which is oriented in the same direction as the connection surface.

16. The ultrasonic welding head according to claim 13, wherein an extension direction of an intersection line between the welding surface and the connection surface is a first direction, a second direction is perpendicular to the first direction, and the centers of the first tooth and the second tooth are aligned with each other in the second direction.

17. The ultrasonic welding head according to claim 16, wherein in the second direction, the first tooth has a dimension less than that of the second tooth; and in the first direction, the first tooth has a dimension equal to that of the second tooth.

18. A welding device, comprising an ultrasonic welding head of claim 1.

* * * * *